(12) United States Patent
Jean-Mary et al.

(10) Patent No.: US 9,925,745 B2
(45) Date of Patent: Mar. 27, 2018

(54) MULTI-LAYER THERMOPLASTIC FILMS AND BAGS WITH ENHANCED ODOR CONTROL AND METHODS OF MAKING THE SAME

(71) Applicant: The Glad Products Company, Oakland, CA (US)

(72) Inventors: Fleumingue Jean-Mary, Cincinnati, OH (US); Zaiyou Liu, Cincinnati, OH (US); Judith A. Hollingshead, Cincinnati, OH (US); Helen R. Kemp, Cincinnati, OH (US); Shaun T. Broering, Cincinnati, OH (US); Angela Phillip, Cincinnati, OH (US); Robert T. Dorsey, Willowbrook, IL (US); Dean Ferracane, Willowbrook, IL (US); Sarah A. Kuhl, Willowbrook, IL (US); Jeffrey S. Stiglic, Willowbrook, IL (US); Carmen N. Rodriguez, Loveland, OH (US); Eric D. Dodson, West Chester, OH (US); Laura L. McElroy, Okeana, OH (US); Steven L. Diersing, Cincinnati, OH (US); Melissa J. Wene, Lebanon, OH (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 15/204,683

(22) Filed: Jul. 7, 2016

(65) Prior Publication Data
US 2017/0008261 A1    Jan. 12, 2017

Related U.S. Application Data

(60) Provisional application No. 62/190,125, filed on Jul. 8, 2015.

(51) Int. Cl.
  B32B 27/08    (2006.01)
  B32B 7/02     (2006.01)
  (Continued)

(52) U.S. Cl.
  CPC ............... B32B 27/08 (2013.01); B32B 3/04 (2013.01); B32B 3/266 (2013.01); B32B 7/02 (2013.01);
  (Continued)

(58) Field of Classification Search
  CPC ............. B32B 27/08; B32B 2307/758; B32B 2439/06; B32B 7/02; B32B 7/045;
  (Continued)

(56) References Cited

U.S. PATENT DOCUMENTS

| 4,444,828 A | 4/1984 | Anthony et al. |
|---|---|---|
| 8,927,078 B2 | 1/2015 | Chau et al. |

(Continued)

FOREIGN PATENT DOCUMENTS

| CA | 2048227 A1 | 2/1992 |
|---|---|---|
| CA | 2092968 | 3/2003 |

(Continued)

Primary Examiner — Michael C Miggins
(74) Attorney, Agent, or Firm — Thomas C. Feix

(57) ABSTRACT

A multi-layer thermoplastic film include a first film of thermoplastic material, a second film of thermoplastic material bonded to the first film, and an odor control component disposed between the first film and the second film. A method of manufacturing a multi-layer thermoplastic film coextruding a plurality of layers to form a first film, coextruding a plurality of layers to form a second film, disposing at least one odor control component on at least one of the first film and the second film, and bonding the first and second films together such that the at least one substance is disposed between the first film and the second film.

20 Claims, 11 Drawing Sheets

(51) Int. Cl.
| | |
|---|---|
| B32B 7/04 | (2006.01) |
| B32B 7/14 | (2006.01) |
| B32B 27/16 | (2006.01) |
| B32B 27/30 | (2006.01) |
| B32B 27/32 | (2006.01) |
| B32B 3/04 | (2006.01) |
| B32B 3/26 | (2006.01) |
| B65D 30/08 | (2006.01) |
| B65D 33/12 | (2006.01) |
| B65D 33/28 | (2006.01) |
| B29C 47/06 | (2006.01) |
| B29L 31/00 | (2006.01) |
| B29C 65/08 | (2006.01) |
| B29C 65/18 | (2006.01) |
| B29C 65/00 | (2006.01) |
| B29C 65/02 | (2006.01) |
| B29C 47/00 | (2006.01) |
| B31B 155/00 | (2017.01) |
| B31B 70/74 | (2017.01) |
| B31B 170/20 | (2017.01) |

(52) U.S. Cl.
CPC ............... *B32B 7/045* (2013.01); *B32B 7/14* (2013.01); *B32B 27/16* (2013.01); *B32B 27/306* (2013.01); *B32B 27/32* (2013.01); *B65D 31/02* (2013.01); *B65D 33/12* (2013.01); *B65D 33/28* (2013.01); *B29C 47/0021* (2013.01); *B29C 47/0057* (2013.01); *B29C 47/0059* (2013.01); *B29C 47/0064* (2013.01); *B29C 47/065* (2013.01); *B29C 65/02* (2013.01); *B29C 65/08* (2013.01); *B29C 65/18* (2013.01); *B29C 66/1122* (2013.01); *B29C 66/232* (2013.01); *B29C 66/234* (2013.01); *B29C 66/3452* (2013.01); *B29C 66/431* (2013.01); *B29C 66/433* (2013.01); *B29C 66/45* (2013.01); *B29C 66/71* (2013.01); *B29C 66/723* (2013.01); *B29C 66/73921* (2013.01); *B29C 66/81435* (2013.01); *B29C 66/83413* (2013.01); *B29C 66/83513* (2013.01); *B29C 66/8511* (2013.01); *B29C 2793/0045* (2013.01); *B29L 2031/7129* (2013.01); *B31B 70/79* (2017.08); *B31B 2155/00* (2017.08); *B31B 2155/0014* (2017.08); *B31B 2170/20* (2017.08); *B32B 2255/10* (2013.01); *B32B 2255/26* (2013.01); *B32B 2264/0214* (2013.01); *B32B 2264/067* (2013.01); *B32B 2264/102* (2013.01); *B32B 2264/104* (2013.01); *B32B 2264/12* (2013.01); *B32B 2270/00* (2013.01); *B32B 2274/00* (2013.01); *B32B 2307/308* (2013.01); *B32B 2307/31* (2013.01); *B32B 2307/514* (2013.01); *B32B 2307/7248* (2013.01); *B32B 2307/732* (2013.01); *B32B 2307/758* (2013.01); *B32B 2439/06* (2013.01); *B32B 2439/46* (2013.01); *B32B 2439/70* (2013.01); *B32B 2555/02* (2013.01)

(58) Field of Classification Search
CPC ......... B32B 7/14; B32B 27/16; B32B 27/306; B32B 27/32; B32B 3/04; B32B 3/266; B32B 2255/10; B32B 2255/26; B32B 2264/0214; B32B 2264/067; B32B 2264/102; B32B 2264/104; B32B 2264/12; B32B 2270/00; B32B 2274/00; B32B 2307/308; B32B 2307/31; B32B 2307/514; B32B 2307/7248; B32B 2307/732; B32B 2439/46; B32B 2439/70; B32B 2555/02; B31B 2219/62; B31B 2237/05; B31B 2237/406; B29C 65/08; B29C 65/18; B29C 66/1122; B29C 66/232; B29C 66/234; B29C 66/3452; B29C 66/431; B29C 66/433; B29C 66/45; B29C 66/71; B29C 66/723; B29C 66/73921; B29C 66/81435; B29C 66/83413; B29C 66/83513; B29C 66/8511; B29C 65/02; B29C 2793/0045; B29C 47/0021; B29C 47/0057; B29C 47/0059; B29C 47/0064; B29L 2031/7129; B65D 31/02; B65D 33/12; B65D 33/28

See application file for complete search history.

(56) References Cited

U.S. PATENT DOCUMENTS

| | | |
|---|---|---|
| 9,745,126 B1 | 8/2017 | Cobler |
| 2007/0014992 A1 | 1/2007 | Longmoore |
| 2009/0261103 A1 | 10/2009 | Watson |
| 2012/0009240 A1 | 1/2012 | Stopek et al. |
| 2017/0305662 A1 | 10/2017 | Bolos |

FOREIGN PATENT DOCUMENTS

| | | |
|---|---|---|
| WO | WO03051414 A1 | 6/2003 |
| WO | WO11060405 A1 | 5/2011 |
| WO | WO13074995 A1 | 5/2013 |

| Sample | Mean | Std. Error of Mean |
|---|---|---|
| Blind Single Layer Sample (No Treatment) | 9.10 | 0.35 |
| Single-Layer Technology Sample (1.0 mil) | 4.21 | 0.70 |
| Multi-Layer Technology Sample (0.8 mil) | 4.35 | 0.70 |

MULTI-LAYER THERMOPLASTIC FILMS AND BAGS WITH ENHANCED ODOR CONTROL AND METHODS OF MAKING THE SAME

CROSS-REFERENCE TO RELATED APPLICATIONS

This application claims the benefit of and priority to U.S. Provisional Application No. 62/190,125, filed on Jul. 8, 2015 and entitled "METHOD OF NEUTRALIZING MALODORS AND VOLATILE SUBSTANCE-CONTROLLING COMPOSITION."

BACKGROUND

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

In regard to trash bags formed from thermoplastic films, controlling odors from materials placed in the trash bags (e.g., trash) is a significant concern. As a result, trash bags are often scented to help mask (e.g., hide) the odors that escape from (e.g., permeate through) the trash bags. The trash bags are typically "scented" by coating one or more sides (e.g., the interior or exterior sides) with a fragrance.

Additionally, manufacturers typically attempt to use thicker materials to help prevent odors from escaping products. Conventional understanding is that the mass of thermoplastic film is directly proportional to the ability of the thermoplastic film to hold to both PRM and malodor molecules yielding better odor control performance. The cost to produce products including thermoplastic film is directly related to the cost of the thermoplastic film. Recently the cost of thermoplastic materials has risen. In response, many attempt to control manufacturing costs by decreasing the amount of thermoplastic material in a given product. One way manufacturers may attempt to reduce production costs is to stretch the thermoplastic film, thereby increasing its surface area. Thus, stretched films of reduced thickness can allow manufacturers to use less thermoplastic material to form a product of a given surface area or size. However, a trash bag's ability to control malodorant molecules' permeation through the sidewalls of the trash bag is normally understood to be a function of the thickness of the film used as the sidewalls. As result, stretched films are often more permeable and allow more malodorant molecules (e.g., offensive smells) to escape through the stretched films in comparison to non-stretched (e.g., thicker) films. Thus, manufacturer typically must weigh odor control and manufacturing costs when developing products with thermoplastic films.

Accordingly, there are a number of considerations to be made in thermoplastic films and controlling odors with thermoplastic films.

BRIEF SUMMARY

One or more embodiments of the present disclosure may include a multi-layer thermoplastic film. The multi-layer thermoplastic film may include a first film of thermoplastic material, a second film of thermoplastic material, and an odor control component. The odor control component is positioned on one or more of the first film and the second film. For example, the odor control component can be positioned between the first and second films. The multiple films of the multi-layer thermoplastic film can allow for a reduction in overall mass compared to a single layered film without compromising odor control performance.

One or more embodiments of the present disclosure may include a multi-layer bag. The multi-layer bag may include a first sidewall and a second sidewall joined along a bottom edge, a first side edge, and an opposing second side edge. Each of the first sidewall and the second sidewall may include a first film of thermoplastic material, a second film of thermoplastic material non-continuously bonded to the first film, and an odor control component disposed one or more of the first film and the second film.

Some embodiments of the present disclosure include a method of manufacturing a multi-layer thermoplastic film. The method may include coextruding a plurality of layers to form a first film, coextruding a plurality of layers to form a second film, disposing at least one deodorizing substance on at least one of the first film and the second film, and discontinuously bonding the first and second films together such that the at least one substance is disposed between the first film and the second film.

Additional features and advantages of will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings in which.

DETAILED DESCRIPTION

Figure 1:
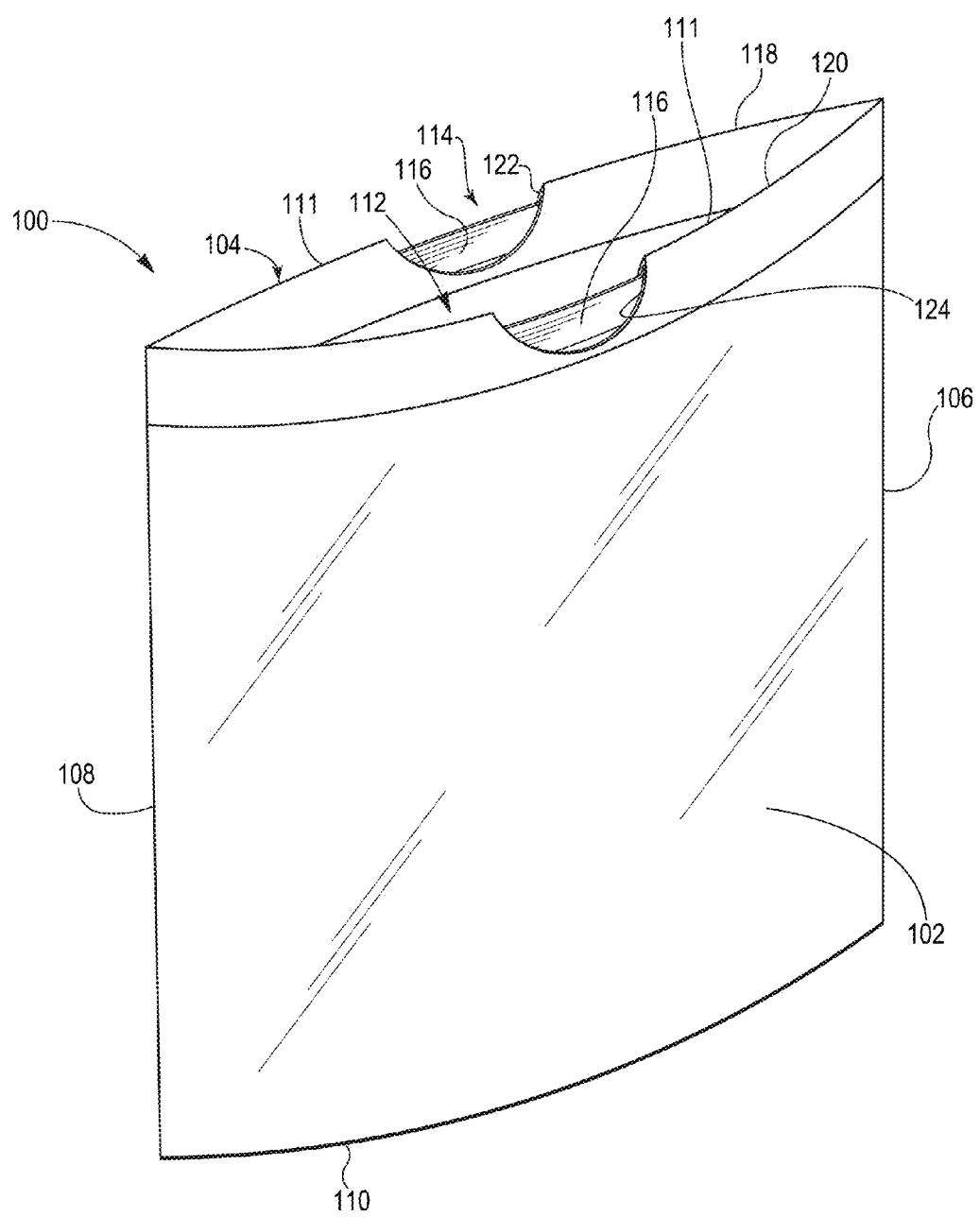
FIG. 1 shows a perspective view of a multi-layer bag according to an embodiment of the present of the present invention.

One or more implementations of the present disclosure include multi-layer films for controlling the permeation of malodorant molecules and perfume raw material (PRM") molecules (through the multi-layer films. The multi-layer films include a first film and a second film with an odor control component disposed on one or more of, or between, the first film and the second film. More specifically, the multi-layer film can comprise an odor control component disposed between the first and second films.

The odor control component can comprise one or more of volatile fragrances and odor control agents. For example, the odor control component comprises one or more of desiccant materials, antimicrobial agents, deodorizing agents, or functional nanoparticles. As a result, in one or more embodiments, the odor control component reduces an amount of malodorant molecules that permeate through the multi-layer films, masks malodorant molecules, and/or otherwise neutralizes malodor.

Some embodiments include an odor control component that at least partially absorbs and/or traps malodorant molecules. In other words, the odor control component can "catch" the malodorant molecules. By absorbing and/or trapping the malodorant molecules, the odor control component can help reduce or prevent the malodorant molecules from permeating through the multi-layer film.

In embodiments in which the odor control component is between the first and second films, the odor control components can comprise substances not typically used for "scenting" films. For example, the first and second films can act as shielding between the odor control component and a consumer. As a result, multilayer films of one or more embodiments can employ liquids, sticky, and/or oily materials as an odor control component. Furthermore, multilayer films of one or more embodiments employ substances that might cause skin irritations or inhalation concerns as odor control components. Moreover, multilayer films of one or more embodiments "hide" unsightly substances between the first and second films.

Some embodiments of the present disclosure include a multi-layer film tailored to provide an enhanced release of one or more substances of the odor control component. Specifically, disposing the odor control component between the first film and the second film may provide control of a rate at which the one or more substances of the odor control component are released and/or a direction in which the one or more substances of the odor control component are released. Furthermore, one or more embodiments can comprise an odor control component between the first and second films and on an outer surface of one or more of the first and second films. This allows the multi-layer film to include different odor control components that release at different times or have different functions/effects.

Furthermore, one or more embodiments of the present disclosure include multi-layer films with reduced gauges (e.g., thicknesses) that provide an increased or equal control of malodorant molecule permeation through the multi-layer films when compared to thicker single layer films. In other words, one or more embodiments of the present disclosure provide thinner overall multi-layer films (in comparison to thicker single layer films) without losing (e.g., yielding) control of malodorant molecule permeation through the multi-layer film. Thus, one or more implementations of the present disclosure reduce an amount of material needed to produce a product without compromising important product properties, such as controlling the permeation of malodorant molecules through the product. In other words, one or more embodiments of the present disclosure include the unexpected result of using less material than a control film while having maintaining (or without degrading) the odor control properties compared to the control film. One will appreciate in view of the disclosure herein that such material reductions can provide significant cost savings by reducing an amount of raw material in a given product. The ability to reduce material without sacrificing odor control is a significant advancement.

Moreover, some embodiments of the present disclosure include multi-layer films that are discontinuously bonded together. In other words, in one or more embodiments, the adjacent layers of the multi-layer film are incrementally separated and joined. Put another way, discontinuously bonding the first and second films together may result in un-bonded regions and bonded regions of the first and second films. In some embodiments, the odor control component is disposed between the first and second films within the un-bonded regions. Disposing the odor control component within the un-bonded regions provides separations (e.g., distinct portions) of the odor control component. As a result, the multilayer films of one or more embodiments can employ incompatible and/or antagonistic substances within the odor control components in different regions of the multi-layer film. For example, a first substance may be used within a first region of un-bonded regions of the multi-layer film, and a second substance incompatible with the first substance may be used within a second different region of un-bonded regions of the multi-layer film.

One or more embodiments of the present disclosure include products made from or with such multi-layer films. For example, such products include, but are not limited to, grocery bags, trash bags, sacks, and packaging materials, feminine hygiene products, baby diapers, adult incontinence products, or other products. For ease in description, the figures and bulk of the following disclosure focuses on films and bags. One will appreciate that teachings and disclosure equally applies to other products. For example, some embodiments of the present disclosure include nonwovens in place of the films described herein. Additional embodiments of the present disclosure include other materials in place of the films described herein.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly (ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some embodiments of the present disclosure may include any flexible or pliable thermoplastic material that may be formed or drawn into a web or film. Furthermore, the thermoplastic materials may include a single layer or multiple layers as described in further detail below in regard to FIGS. 3A-3C. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

Additional additives that may be included in one or more embodiments include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

Further additives that may include in one or more embodiments include natural oils. For example, the additives may include thyme oil, mint oil, lemon grass oil, tea tree oil, cinnamon bark oil, methyl jasmonate, etc. Yet further additives may include zinc pyrithione ("ZPT") and copper pyrithione ("CPT"), which inhibit microbial growth.

One or ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more embodiments, a manufacturer can use multiple extruders to supply different melt streams, which a feed block can order into different channels of a multi-channel die. The multiple extruders can allow a manufacturer to form a multi-layer film with layers having different compositions. Such multi-layer film may later be non-continuously laminated with another layer of film to provide the benefits of the present disclosure.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

As used herein, the terms "odor control component" refer to a composition that effects (e.g., changes and/or masks) odors in at least one manner. For example, the "odor control component" may absorb malodorants (e.g., foul smell odors) and/or may release fragrance materials. Furthermore, the "odor control component" may mask (e.g., cover up) and/or neutralize malodorants. As used herein the term "neutralize" or any of its derivative terms refers to an ability of a compound or product to reduce or eliminate malodorous compounds. Odor neutralization may be partial, affecting only some of the malodorous compounds in a given context, or affecting only a portion of a malodorous compound. A malodorous compound may be neutralized by chemical reaction resulting in a new chemical entity, by sequestration, by chelation, by association, or by any other interaction rendering the malodorous compound less malodorous or non-malodorous.

As used herein, the term "odor" refers to any substance that can stimulate an olfactory response in a human; i.e., sense of smell.

As used herein the term "malodor" and any of its derivative terms refers to an odor that is generally considered unpleasant, obnoxious, or nauseating by the general population, such as the broad spectrum odors associated with household trash, including odors related to stale urine, feces, vomitus, and putrefying organic materials, e.g., food waste, in common household trash.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, any relational terms such as "first," "second," and "third," "inner," "outer," "upper," "lower," "side," "top," "bottom," etc. are for clarity and convenience in understanding the present disclosure and accompanying drawings and does not connote or depend on any specific preference, orientation, or order, except where the context clearly indicates otherwise. For example, the relational terms may refer an orientation of a multi-layer bag while disposed within a receptacle (e.g., a trash can) for use.

FIG. 1 is a perspective view of a multi-layer thermoplastic bag 100 according to an embodiment of the present disclosure. The multi-layer bag 100 includes a first sidewall 102 and a second sidewall 104. Each of the first and second sidewalls 102, 104 includes a first side edge 106, a second opposite side edge 108, a bottom edge 110 extending between the first and second side edges 106, 108, and top edge 111 extending between the first and second side edges 106, 108 opposite the bottom edge. In some embodiments, the first sidewall 102 and the second sidewall 104 are joined together along the first side edges 106, the second opposite side edges 108, and the bottom edges 110. The first and second sidewalls 102, 104 may be joined along the first and second side edges 106, 108 and bottom edges 110 by any suitable process such as, for example, a heat seal. In alternative embodiments, the first and second sidewalls 102, 104 may not be joined along side edges. Rather, the first and second sidewalls 102, 104 may be a single uniform piece. In other words, the first and second sidewalls 102, 104 may form a sleeve or a balloon structure.

In some embodiments, the bottom edge 110 or one or more of the side edges 106, 108 can comprise a fold. In other words, the first and second sidewalls 102, 104 may comprise a single unitary piece of material. The top edges 111 of the first and second sidewalls 102, 104 may define an opening 112 to an interior of the multi-layer bag 100. In other words, the opening 112 may be oriented opposite the bottom edge 110 of the multi-layer bag 100. Furthermore, when placed in a trash receptacle, the top edges 111 of the first and second sidewalls 102, 104 may be folded over the rim of the receptacle.

In some embodiments, the multi-layer bag 100 may optionally include a closure mechanism 114 located adjacent to the top edges 111 for sealing the top of the multi-layer bag 100 to form an at least substantially fully-enclosed container or vessel. As shown in FIG. 1, in some embodiments, the closure mechanism 114 comprises a draw tape 116, a first hem 118, and a second hem 120. In particular, the first top edge 111 of the first sidewall 102 may be folded back into the interior volume and may be attached to an interior surface of the first sidewall 102 to form the first hem 118. Similarly, the second top edge 111 of the second sidewall 104 is folded back into the interior volume and may be attached to an interior surface of the second sidewall 104 to form a second hem 120. The draw tape 116 extends through the first and second hems 118, 120 along the first and second top edges 111. The first hem 118 includes a first aperture 122 (e.g., notch) extending through the first hem 118 and exposing a portion of the draw tape 116. Similarly, the second hem 120 includes a second aperture 124 extending through the second hem 120 and exposing another portion of the draw tape 116. During use, pulling the draw tape 116 through the first and second apertures 122, 124 will cause the first and second top edge 110 to constrict. As a result, pulling the draw tape 116 through the first and second apertures 122, 124 will cause the opening 112 of the multi-layer bag to at least partially close or reduce in size. The draw tape closure mechanism 114 may be used with any of the implementations of a reinforced thermoplastic bag described herein.

Although the multi-layer bag 100 is described herein as including a draw tape closure mechanism 114, one of ordinary skill in the art will readily recognize that other closure mechanisms 114 may be implemented into the multi-layer bag 100. For example, in some embodiments, the closure mechanism 114 may include one or more of flaps, adhesive tapes, a tuck and fold closure, an interlocking closure, a slider closure, a zipper closure, or any other closure structures known to those skilled in the art for closing a bag.

Figures 2A, 2B:
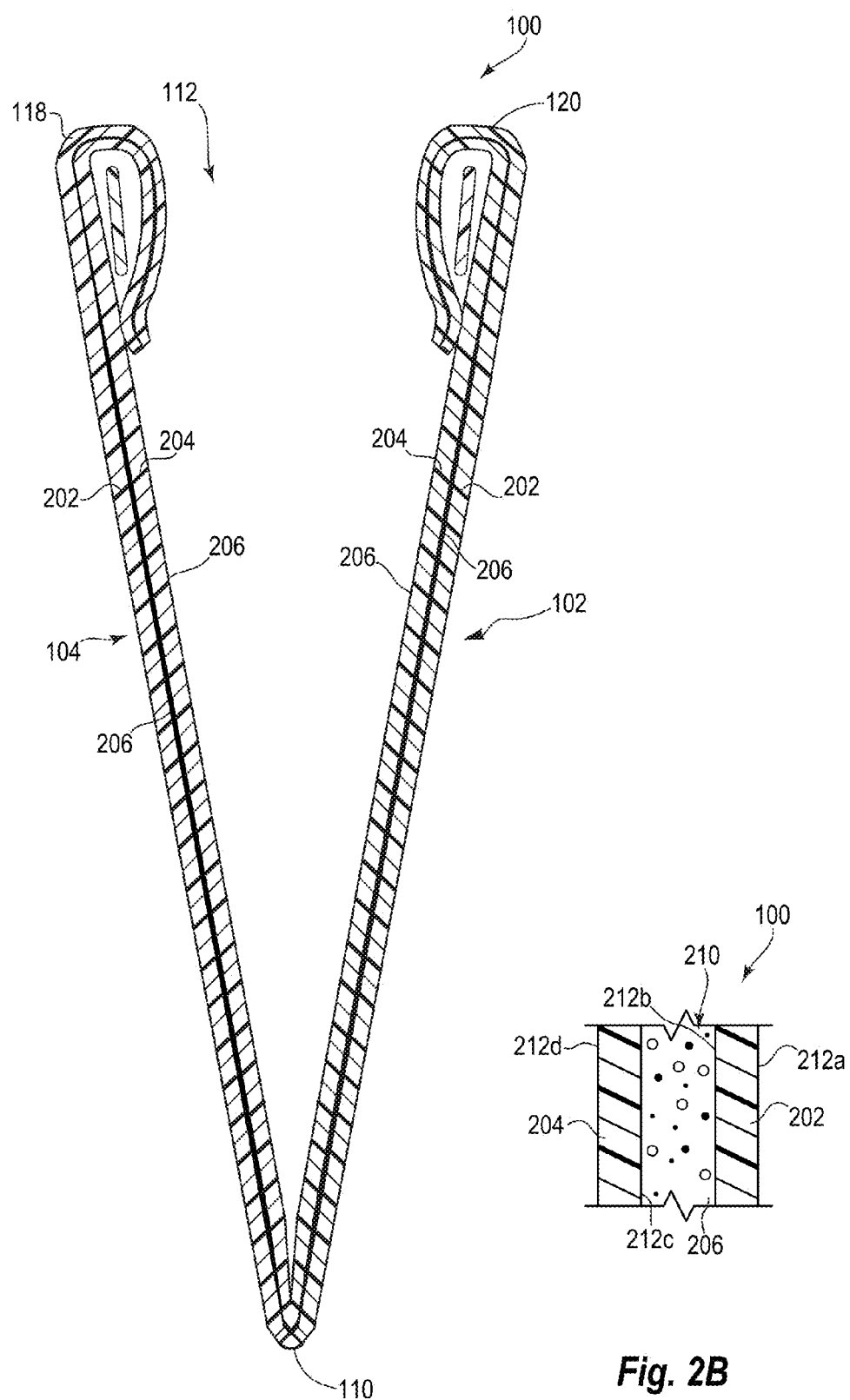
FIG. 2A shows a side cross-sectional view of the multi-layer bag of FIG. 1.
FIG. 2B shows an enlarged partial side cross-sectional view of a sidewall of the multi-layer bag of FIG. 2A.

FIG. 2A is a side cross-sectional view of the multi-layer bag 100 of FIG. 1. FIG. 2B is an enlarged view of the side cross-sectional view of the multi-layer bag 100 of FIG. 2A. Referring to FIGS. 2A and 2B together, each of the first and second sidewalls 102, 104 of the multi-layer bag 100 include a multi-layer film. In particular, each of the first and second sidewalls 102, 104 include a first film 202, a second film 204. The multi-layer bag 100 further comprises an odor control component 206 disposed on one or more of the first and second films 202, 204. When disposed within a receptacle (e.g., trash can), the first film 202 of the multi-layer film of each of the first and second sidewalls 102, 104 (referred to herein collectively as "the first film 202") of the multi-layer bag 100 may face (e.g., be oriented adjacent to and proximate to) the receptacle, and the second film 204 of each of the first and second sidewalls 102, 104 (referred to herein collectively as "the second film 204") may face (e.g., at least partially define) the interior of the of the multi-layer bag 100.

The first and second films 202, 204 may include films such as any of the films described above. In some embodiments, each of the first and second films 202, 204 may have a gauge (e.g., thickness and/or average distance between major surfaces of the film) within a range of about 0.1 mils to about 10 mils. In some embodiments, each of the first and second films 202, 204 may have a gauge within a range of about 0.1 mils to about 4 mils. In some embodiments, each of the first and second films 202, 204 may have a gauge within a range of about 0.1 mils to about 2 mils. In some embodiments, each of the first and second films 202, 204 may have a gauge within a range of about 0.1 mils to about 1 mil. In some embodiments, each of the first and second films 202, 204 may have a gauge within a range of about 0.2 mils to about 0.8 mils. For example, each of the first and second films 202, 204 may have a gauge of about 0.4 mils. Additionally, as shown in FIGS. 2A and 2B, in some embodiments, the first and second films 202, 204 may have gauges (e.g., thicknesses) at least substantially equal to each other. In other implementations, one of the first and second films 202, 204 may be thinner or thicker than the other.

Furthermore, in some embodiments, each of the first and second films 202, 204 may have a uniform (e.g., consistent) gauge. In alternative embodiments, one or more of the first and second films 202, 204 can be rough or uneven. Moreover, the gauge of one or more of first and second films 202, 204 need not be uniform. As a result, the gauge of one or more of the first and second films 202, 204 can vary due to product design, manufacturing defects, tolerances, or other processing issues.

As mentioned briefly above, the odor control component 206 may be disposed on one or more of the first film 202 and the second film 204. Specifically, the first and second films 202, 204 may be at least partially dosed with the one or more substances comprising the odor control component 206. The one or more substances may be disposed between the first and second films 202, 204. As used herein, the term "between," when referring to the odor control component 206 and the first and second films 202, 202, means that the odor control component 206 is disposed at least partially within a space separating at least a portion of the first film 202 and at least a portion of the second film 204. Thus, the odor control component 206 may be disposed on one or more of the first and second films 202, 202 (e.g., on a side of the first and second films 202, 202 facing the space separating the films 202, 204 from each other). Furthermore, the odor control component 206 may be disposed at least partially in (e.g., at least partially embedded in) one or more of the first and second films 202, 202.

In some embodiments, the odor control component 206 may at least substantially fully span an area between the first film 202 and the second film 204. In other words, the odor control component 206 may at least substantially fully span a length and width of the first and second films 202, 204. In other embodiments, the odor control component 206 may be disposed between only portions of the first and second films 202, 204. In other words, the odor control component 206 may not be continuous and may span only portions of the area between the first film 202 and the second film 204. In additional embodiments, the odor control component 206 may be included in the first and second films 202, 204 (via inclusion in master batch used to form the first and second films 202, 204) in additional to being disposed between the first and second films 202, 204.

In some embodiments, the first and second sidewalls 102, 104 include an air gap 210 between the first and second films 202, 204 that works in conjunction with the odor control component. The air gap 210 provides a space to trap malodor. In particular, the air gap permits molecular diffusion of water vapor through at least the second film 204 to inhibit microbial growth within the bag 100.

Additionally, the air gap 210 provides a means of trapping malodor. In particular, malodor can pass into the air gap 210 and be at least partially trapped within the air gap 210. Thus, the air gap 210 can reduce or prevent malodor from passing through the outer film 202 of the bag 100. Additionally, one or more embodiments include a malodor control component within the air gap 210 that can help absorb or trap malodor.

The odor control component 206 may include one or more substances. The one or more substances may include gaseous, liquid, colloidal suspensions, and/or solid substances. In one or more embodiments, the odor control component 206 may include one or more of volatile fragrance materials (i.e., fragrance materials capable of being transported to the olfactory system) and deodorizing agents (e.g., deodorizing compositions with a deodorizing effect on offensive odors such as that associated with activated nitrogen compound, activated sulfur compounds, etc.). As used herein the term "fragrance" refers to any mixture or composition comprising one or more perfume raw materials with or without one or more carrier solvents configured to emit a pleasant odor. Moreover, as used herein the term "perfume" refers to a compound utilized for its appealing odor. Compounds may have a pleasing odor without being used as a perfume in the context of this disclosure.

Moreover, the odor control component 206 may include one or more of desiccant materials (e.g., a hygroscopic substance, such as calcium oxide or silica gel, that has a high affinity for water and is used as a drying agent), antimicrobial agents (e.g., zinc pyrithione ("ZPT") and/or copper pyrithione ("CPT")), deodorizing agents, and functional nanoparticles. In yet further embodiments, the odor control component may include an absorbent agent. Additionally, odor control components within the air gap 210 can influence the transmission rate or allow for a delay release. Furthermore, one or more embodiments involve using the air gap 210 to alter the pH of odoriferous species and mitigate formation of odor causing agents.

The air gap 210 can provide an area for disposing of odor control component 206 that conceals the odor control component 206. Thus, one or more embodiments includes an odor control component unsuitable for use in an unconcealed portion of a bag. For example, the odor control component 206 between the inner and outer films 202, 204 can comprise an odor control component 206 that lacks aesthetically pleasing characteristics generally desired by consumers. As an example, the odor control component 206 can comprise activated carbon. The air gap 220 and its function as an odor control component 206 is described in further detail below in regard to FIGS. 4A and 4B.

In another embodiment, the odor control component 206 comprises negative effects to a consumer, such as skin irritation issues, dust inhalation issues, or other negative effects when combined with consumer interaction. For example, the odor control component 206 can comprise calcium carbonate, magnesium carbonate, barium carbonate, alumina, magnesium oxide, zinc oxide, superabsorbent polymers, calcium chloride, zeolite (aluminosilicates), pulp (wood) powder, or any combination thereof. The ability to conceal the odor control component between the inner and outer films 202, 204 can prevent skin irritation issues, dust inhalation issues, or other negative effects associated with the foregoing sub stances.

In another embodiment, the odor control component 206 comprises wet substances that have a negative effect for users of the bag. For example, the odor control component can comprise copper chloride colloidal nanoparticles, or metal salts of polyitaconic acid resins (i.e., poly (sodium zinc itaconate). The air gap 210 can prevent a user from touching or accessing such wet odor control components.

In another embodiment, the odor control component 206 comprises a sticky substance that would be unfit for use on an exposed surface of the bag 100. As used herein, the term "sticky" may refer to a material that tending to stick to (e.g., at least partially attach to) surfaces upon contact. For example, the odor control component 206 can comprise polyethylene glycol copolymers, polyethylenimine, or silicone. By disposing the sticky odor control component 206 between the inner and outer films 202, 204, the multi-layered bag 100 can prevent a user from interacting with the sticky odor control component 206.

In another embodiment the odor control component 206 comprises a substance that with interaction with oxidants cause concern for potential skin irritation. For example, the odor control component 206 can comprise hydrogen peroxide, peroxydone, halohydantoins, magnesium hydroxide hypochlorite oxide, sodium perborate, sodium percarbonate, or acid catalysts. By disposing such odor control components 206 between the inner and outer films 202, 204, the multi-layered bag 100 can prevent potential irritation or other negative effects.

In additional embodiments, the odor control component 206 comprises natural oils. For example, the odor control component 206 may include thyme oil, mint oil, lemon grass oil, tea tree oil, cinnamon bark oil, methyl jasmonate, etc.

Additionally, the ability to place more volatile perfume materials in between layers for preserving longevity and synergy. In particular, the capability to place a portion of perfume between films can avoid initial fragrance intensity issues (e.g., releasing too much of a fragrance material and causing a resulting smell to be too strong). Along similar lines, the the ability to place an odor control component in the air gap between the films 202, 204 can facilitate higher levels of perfume dosing without exposing a user to an oily feel inside the bag. Thus, the odor control component 206 can comprise perfume technologies, higher levels of perfume, diethanol amine, triethanol amine, sulfur scavengers, molecular sieves, etc.

Furthermore, in some embodiments, where the odor control component 206 is disposed between the first film 202 and the second film 204 may be selected based on where the odor control component 206 will be located relative to the multi-layer bag 100. For example, the odor control component 206 may be disposed between the first film 202 and the second film 204 at the bottom area of the multi-layer bag 100 (e.g., a portion of the bag most likely to be exposed to malodorant molecules). Furthermore, in some embodiments, the one or more substances of the odor control component 206 may be selected based on where the odor control component 206 will be located relative to the multi-layer bag 100. For example, deodorizing agents may be selected for portions of the odor control component 206 located at the bottom portion of the multi-layer bag 100, and fragrance materials may be selected for portions of the odor control component 206 located at the top portion of the multi-layer bag 100.

In some embodiments, the odor control component 206 may include a plurality of different components. For example, the odor control component 206 may include a first component of a deodorizing agent and a second component of a volatile fragrance material. In another non-limiting example, the odor control component 206 may include a first component of a deodorizing agent, a second component of an antimicrobial agent, and a third component of a volatile fragrance material. Furthermore, in some embodiments, the odor control component 206 may include a plurality of different component to render scents of different expressions (e.g., intensity and/or character).

As shown in FIGS. 2A and 2B, the inner surface of the bag 212d can have a first surface area. Typically, the inner surface 212d of the bag is the only surface upon which an odor control components are applied. One will appreciate in light of the disclosure herein that the multi-layer bag 100 includes additional surfaces 212b and 212c (i.e., the surfaces of the inner and outer films 202, 204 facing each other and forming the air gap 210). Thus, in one or more embodiments, the multi-layer bag 100 can have odor control components 206 applied to a total surface area that is greater than the surface area of the inside layer of the bag 100 (i.e., by applying odor control components to surfaces 212a, 212b, and/or 212c.

The odor control component 206 may help to reduce an amount of malodorant molecules (e.g., bad smelling molecules) that permeate through the multi-layer film of the first and second sidewalls 102, 104 of the multi-layer bag 100. Additionally, the odor control component 206 may help to control an amount of PRM molecules that permeate through the multi-layer film of the first and second sidewalls 102, 104 of the multi-layer bag 100. As used herein, the term "permeate" may refer to molecules that pass through the first and second sidewalls 102, 104 or any portions therefore. Furthermore, the term "permeable" and any of its derivative terms when referring to a material means that the material has pores, gaps or other means through which fluids (e.g., gases and/or liquids) can pass. Specifically, when referring to a liquid, no force beyond gravity is necessary for the liquid to move across a liquid-permeable material once that material is saturated with the liquid. When referring to a gas, no force beyond simple diffusion (i.e., the movement of molecules from higher to lower concentrations) is necessary for the gas to move across a gas-permeable material once that material is saturated with that gas.

In some embodiments, the odor control component 206 may help prevent malodorant molecules from permeating through the multi-layer film of the multi-layer bag 100. For example, the odor control component 206 may at least partially absorb and/or trap malodorant molecules that permeate into the odor control component 206 from the interior of the multi-layer bag 100. In other words, the odor control component 206 may "catch" the malodorant molecules. In some embodiments, air within the odor control component 206 (e.g., air bubbles) may trap the malodorant molecules. Furthermore, the odor control component 206 may trap malodorant molecules by reacting with the malodorant molecules with, for example, reactive substances. In some embodiments, the odor control component 206 may also neutralize malodorant molecules by reacting with the malodorant molecules. By absorbing and/or trapping the malodorant molecules, the odor control component 206 may prevent the malodorant molecules from permeating to an exterior of the multi-layer bag 100. As a result, the multi-layer bag 100 of the present disclosure may allow less malodorant molecules to permeate through the multi-layer film of the first and second sidewalls 102, 104 of the multi-layer bag 100 in comparison to sidewalls of conventional thermoplastic bags.

Referring still to FIGS. 2A and 2B, disposing the odor control component 206 between the first film 202 and the second film 204 instead of disposing the odor control component 206 on a single side of a single layer film may enhance a release of the one or more substances of the odor control component 206. Specifically, disposing the odor control component 206 between the first film 202 and the second film 204 may provide control of a rate at which the one or more substances of the odor control component 206 are released and/or a direction in which the one or more substances of the odor control component 206 are released.

In some embodiments, the multi-layer bag 100 may provide increased control of a rate at which the one or more substances of the odor control component 206 are released in comparison to single layer bags. For example, disposing the one or more substances of the odor control component 206 on a single side of a single layer film (e.g., exposing the odor control component 206 to either the interior or exterior of the thermoplastic bag) provides little to no control of when or a rate at which the one or more substances of the odor control component 206 are released. On the other hand, disposing the one or more substances of the odor control component 206 between the first and second films 202, 204 (e.g., at least substantially surrounding the odor control component 206 with the first and second films 202, 204) provides control of when and a rate at which the one or more substances of the odor control component 206 are released. For example, the one or more substances may be released when one of the first and second films 202, 204 are torn and/or punctured. Furthermore, the one or more substances of the odor control component 206 may permeate through the first and second films 202, 204 to provide a constant consistent release of the one or more substances. Moreover, in some embodiments, the materials of the first and second films 202, 204 may be selected to provide a specific release rate of the one or more substances of the odor control component 206. For example, the permeability of materials of the first and second films 202, 204 may be selected to increase or decrease a release rate of the one or more substances. In other words, the release rate of the one or more substances of the odor control component 206 may be time controlled.

Furthermore, in some embodiments, the odor control component 206 may include a plurality of different substances that are configured to be released at different times. For example, the odor control component 206 may include a first odor-control element that releases during a first 24-hr period, a second odor-control element that releases during a second 24-hr period (e.g., hours 24 to 28), and a third odor-control element that releases during a third 24-hr period (e.g., hours 48 to 72). As another non-limiting example, the odor control component 206 may include a first layer that releases a fragrance material initially, a second layer that releases a fragrance material after a certain period of time (e.g., has a delayed release), and a third layer that releases a fragrance material after longer a certain period of time (e.g., has a longer delayed release). For example, in some embodiments, one or more portions of the odor control component 206 may be encapsulated to delay a release of that portion of the odor control component 206. In some embodiments, the one or more portions of the odor control component 206 may be encapsulated within one or more of starch, cyclodextrins starch materials, or perfume microcapsules. The microcapsules may include melamine, polyacrylamide, silicones, silica, polystyrene, polyurea, polyurethanes, polyacrylate based materials, gelatin, styrene malic anhydride, polyamides, and mixtures thereof. Additionally, the microcapsules may include melamine crosslinked with formaldehyde, melaminedimethoxyethanol crosslinked with formaldehyde, and mixtures thereof. In further embodiments, the microcapsules may include polyestyrene crosslinked with divinylbenzene, urea crosslinked with formaldehyde, urea crosslinked with gluteraldehyde, polyacrylate formed from methylmethacrylate or dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof. Furthermore, the perfume microcapsule may be coated with a deposition aid, a cationic polymer, a non-ionic polymer, an anionic polymer, or mixtures thereof. Suitable polymers may be include polyvinylformaldehyde, partially hydroxylated polyvinylformaldehyde, polyvinylamine, polyethyleneimine, ethoxylated polyethyleneimine, polyvinylalcohol, polyacrylates, and combinations thereof. In yet further embodiments, the odor control component 206 may include perfume material complexes (e.g., materials used in Schiff base reactions). In other words, the odor control component 206 may include catalysts used to at least partially neutralize malodorant molecules.

In one or more embodiments, the multi-layer bag 100 may provide control of a direction in which the one or more substances of the odor control component 206 are released. In other words, the multi-layer bag 100 allows control of whether the one or more substances (or a majority of the one or more substances) are released toward an interior of the multi-layer bag 100 (e.g., toward the trash) or toward the receptacle (e.g., trash can) in which the multi-layer bag 100 is disposed. For example, the permeabilities of materials of the first and second films 202, 204 may be selected such that one of the first and second films 202, 204 is more permeable than the other. As a result, the one or more substances of the odor control component 206 may permeate through the more permeable film of the first and second films 202, 204 at a greater rate than through the less permeable film of the first and second films 202, 204. Furthermore, the permeabilities of materials of the first and second films 202, 204 may be selected based on the one or more substances of the odor control component 206. For example, when the one or more substances are predominantly deodorizing agents, the permeabilities of materials of the first and second films 202, 204 may be selected such that the second film 204 (e.g., film closest to the interior of the multi-layer bag 100) is more permeable than the first film 202. In other words, the one or more substances of the odor control component 206 may be controlled to permeate toward the interior of the multi-layer bag 100 (e.g., toward the contents of the multi-layer bag 100 (i.e., trash)). As another non-limiting example, when the one or more substances are predominantly volatile fragrance materials, the permeabilities of materials of the first and second films 202, 204 may be selected such that the first film 202 (e.g., film closest to the receptacle) is more permeable than the second film 204. In other words, the one or more substances may be controlled to permeate toward the receptacle (e.g., exterior of the multi-layer bag 100) in which the multi-layer bag 100 is disposed.

As noted briefly above, in some embodiments, the odor control component 206 of the multi-layer bag 100 may include a plurality of different layers. For example, the odor control component 206 may include a first layer including a volatile fragrance material, and the first layer may be disposed adjacent to or on the first film 202. In other words, the volatile fragrance material of the first layer may be more prone to permeate through the first film 202 and toward the receptacle (e.g., trash can). Furthermore, the odor control component 206 may include a second layer including a deodorizing agent, and the second layer may be disposed adjacent to or on the second film 204. In other words, the deodorizing agent of the second layer may be more prone to permeate through the second film 204 and toward the interior of the multi-layer bag 100 (e.g., toward the trash).

In view of the foregoing, the multi-layer bag 100 of the present disclosure may maintain a fresher (e.g., cleaner) smell when compared to conventional thermoplastic bags even when contents of the multi-layer bag 100 have a bad odor. As a result, rooms in which the multi-layer bags 100 are used as trash bags may maintain a better smell. Furthermore, the multi-layer bag 100 of the present disclosure may reduce an amount of malodorant molecules that come into contact with a receptacle (e.g., trash can) in which the multi-layer bag 100 may be inserted. Accordingly, receptacles using multi-layer bags 100 of the present disclosure may smell better than receptacles using conventional thermoplastic bags. As an additional result, receptacles using multi-layer bags 100 of the present disclosure may require less cleaning than receptacles using conventional thermoplastic bags.

Still referring to FIGS. 2A-2B, disposing the odor control component 206 between the first film 202 and the second film 204 of the multi-layer bag 100 may allow the multi-layer bag 100 to utilize substances as the odor control component 206 that not typically practical in scented thermoplastic bags. Specifically, the first and second films 202, 204 may serve to segregate (e.g., isolate) the odor control component 206 from a consumer and from anything placed within the multi-layer bag 100 (e.g., trash). Because the first and second films 202, 204 isolate the odor control component 206, substances that are not typically used in conjunction with trash bags, but otherwise are effective fragrance materials and/or deodorizing agents, may be utilized within the odor control component 206. As a non-limiting example, substances that are wet (e.g., liquid), dusty (e.g., loose granules), oily, and/or sticky, which would typically would not be usable on a thermoplastic bag, may be used within the odor control component 206. For example, due to safety concerns, substances that can cause skin irritations and inhalation concerns are not typically applied to the trash bags. However, because the first and second films 202, 204 serve (e.g., act) as a shield between the consumer and the odor control component 206, such substances may be utilized within the odor control component 206. Furthermore, for practical reasons and consumer usability concerns, liquids and sticky and/or oily substances are typically not applied to the trash bags. However, because the first and second films 202, 204 isolate the odor control component 206 (e.g., prevents contact between a consumer and the odor control component 206 and/or escape of the odor control component 206), liquids and sticky and/or oily substances are more practical and therefore, usable, within the odor control component 206. Moreover, for aesthetic reasons, unsightly substances (e.g., dirty appearing substances) are not typically applied to the trash bags. However, because the first and second films 202, 204 cover (e.g., hide from view) the odor control component 206, unsightly (e.g., not aesthetically pleasing) substances may be more readily usable within the odor control component 206. Additionally, potent fragrance materials may not be desirable to apply to trash bags because an initial smell of the fragrance material may be "too strong" for consumers. Yet, as described above, a permeation rate of the odor control component 206, and therefore, an initial smell, can be controlled via the first and second films 202, 204. Thus, more potent fragrance materials (e.g., fragrances materials having a greater power and/or effect) than are conventionally used within trash bags are usable within the odor control component 206 of the multi-layer film of the present disclosure.

In one or more embodiments, the odor control component 206 may comprise a bonding layer. In other words, the odor control component 206 may at least partially bond the first film 202 to the second film 204. For example, the odor control component 206 may include one or more of an adhesive, glue, tackifier, tapes, or any other known material for bonding films together. In such embodiments, the odor control component 206 may also include the one or more substances described above (e.g., volatile fragrance materials and deodorizing agents). Thus, the odor control component 206 may perform two functions, controlling odors and bonding the first film 202 to the second film 204.

Figure 3C:
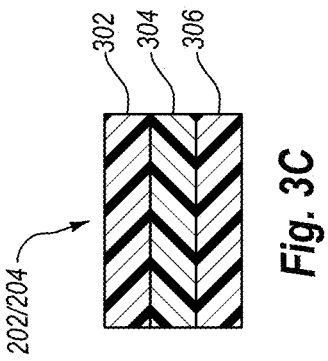
FIGS. 3A-3C show partial side cross-sectional views of films having varying numbers of layers.
Figure 3B:
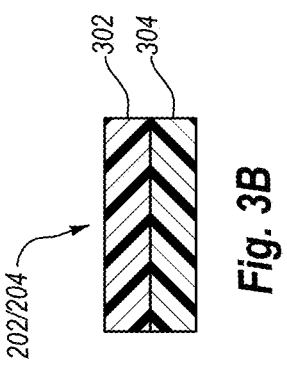
Figure 3A:
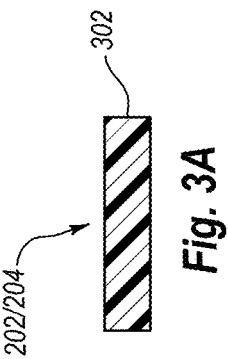

FIGS. 3A-3C are partial cross-sectional views of films that may be used herein as the first and second films 202, 204. Referring to FIGS. 2A-3C together, in some embodiments, one of more of the first and second films 202, 204 may include a single layer 302, as shown in FIG. 3A. In other embodiments, one of more of the first and second films 202, 204 may include two layers 302, 304 (i.e., a bi-layer film), as shown in FIG. 3B. For example, the first film 202 may include a first layer 302 and a second layer 304. In such embodiments, the first and second layers 302, 304 may optionally include different grades of thermoplastic material and/or include different additives, including polymer additives. In yet other embodiments, one of more of the first and second films 202, 204 may include three layers 302, 304, 306 (i.e., a tri-layer film), as shown in FIG. 3C. For example, the first film 202 may include a first layer 302, a second layer 304, and a third layer 304. In yet other embodiments, one of more of the first and second films 202, 204 may include more than three layers.

The multi-layer films of the first and second films 202, 204 may include co-extruded layers. As a non-limiting example, the first and second films 202, 204 may include one or more of the films described in, the disclosure of which is incorporated in its entirety by this reference herein.

In testing performed by the inventors, permeation rates of malodorant molecules through the multi-layer film of the first and second sidewalls 102, 104 of the multi-layer bag 100 of the present disclosure were found to be slower (e.g., less) than permeation rates through thicker sidewalls of single layer bags. This finding is unexpected, as it is generally understood that permeation rates of malodorant molecules are functions of a total mass and/or thickness (e.g., gauge) of plastic films. In other words, as is typically understood, the more mass and/or thickness a film has, the more malodorant molecules the plastic can absorb and retain. Thus, finding that thinner films having less mass than thicker single layer films prevent more or a substantially equal amounts of malodorant molecules from permeating through the thinner films when compared to the thicker single layer films is unexpected.

Figure 4A:
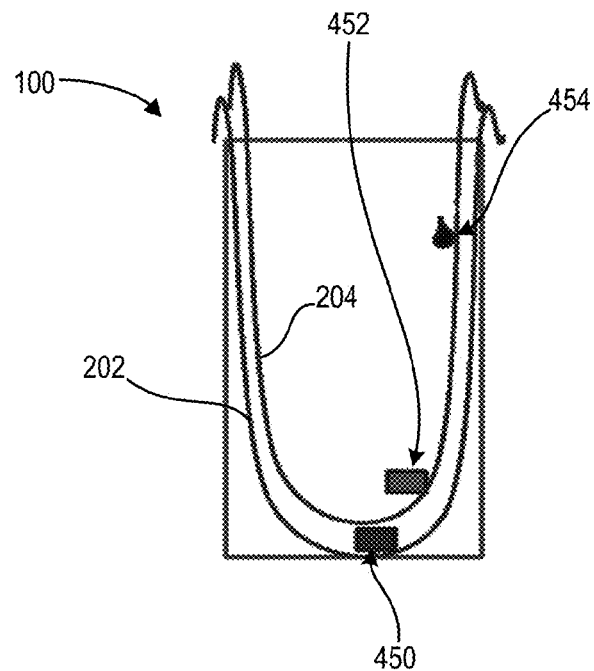
FIG. 4A shows a side cross-sectional view of a multi-layer bag having sensors disposed therein.

FIGS. 4A-8B show results and/or findings of tests performed by the inventors. FIG. 4A illustrates a side cross-sectional view of a multi-layer bag 100 having an air gap between the first and second films 202, 204, a first relative humidity ("RH") sensor 450 placed between the first and second films 202, 204 (e.g., within the air gap 210), and second RH sensor 452 placed on an interior of the multi-layer bag 100. During the test, the interior of the multi-layer bag 100 was exposed to a moisture source 454 for a period of sixty-four hours.

Figure 4B:
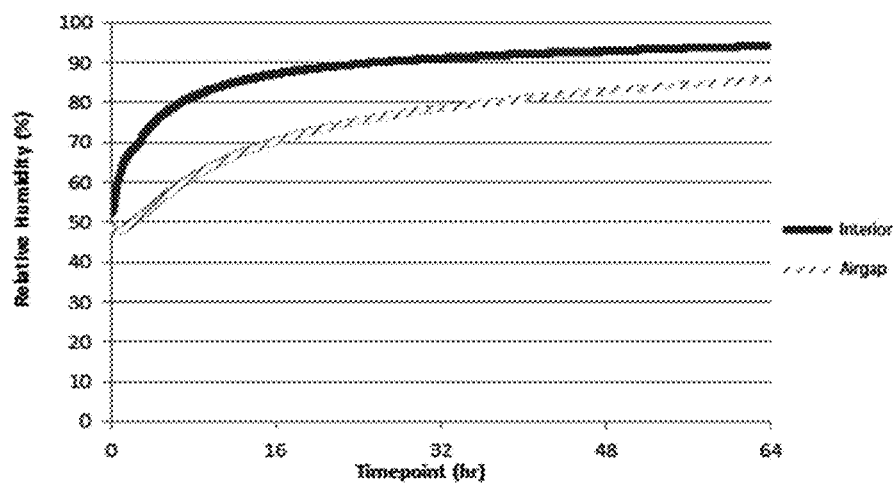
FIG. 4B shows a graph representing relative humidity levels measured within the multi-layer bag by the sensors of FIG. 4A.

FIG. 4B shows the results (e.g., RH buildup within the air gap 210 of the multi-layer bag 100) of the test performed with the multi-layer bag 100 illustrated in FIG. 4A. As shown in FIG. 4B, the RH buildup within the air gap 210 was less than within the interior of the multi-layer bag 100.

As a result, the air gap 210 provides a means of creating a modified atmosphere between the first and second films 202, 204 that can be used as a delayed trigger mechanism of an odor control component 206 (i.e., a delayed occurrence that activates the odor control component 206 to release, for example, fragrance materials). As used herein, the term "activate" in regard to the odor control component refers to causing the odor control component 206 being to release an odor controlling substance (e.g., a fragrance material and/or a deodorizing agent). Common trigger mechanisms could include moisture, pH, odor molecule type, temperature, etc. to activate the encapsulated odor control component. In the case of a moisture activated encapsulated odor control component 206 (e.g., an odor control component 206 that is susceptible to moisture), activation of the odor control component 206 could be delayed as water vapor must first diffuse across either the first or second films 202, 204 and build up in the air gap 210 prior to reaching a moisture level that would "activate" the odor control component 206. In some embodiments, moisture from refuse discarded in the bag 100 could provide the water vapor necessary to activate odor control component. Upon activation of the odor control component 206 within the air gap 210, the resulting odor controlling substance that is released is delayed from reaching the bag interior because the odor controlling substance must absorb into the second film 204, diffuse through the second film 204, and then desorb into the interior of the multi-layer bag 100. The ability to delay the activation of the odor control component 206 is beneficial because the odor control component 206 would become available after malodors start to form and would not be readily used up upon initial use.

As noted briefly above, additional trigger mechanisms for activating the odor control component 206 may include activating the odor control component via pressure and/or friction on the first and second films 202, 204 caused by articles placed in multi-layer bag 100. In other words, the odor control component 206 may be "touch activated." As also mentioned above, the trigger mechanisms for activating the odor control component 206 may further include thermal activation (e.g., heat activating), chemical activation (e.g., using internal odor control component chemistry to cause a reaction), photolytic activation (e.g., using light to activate odor control component 206), and/or pH activation (e.g., using pH value to activate odor control component 206).

Figure 5:
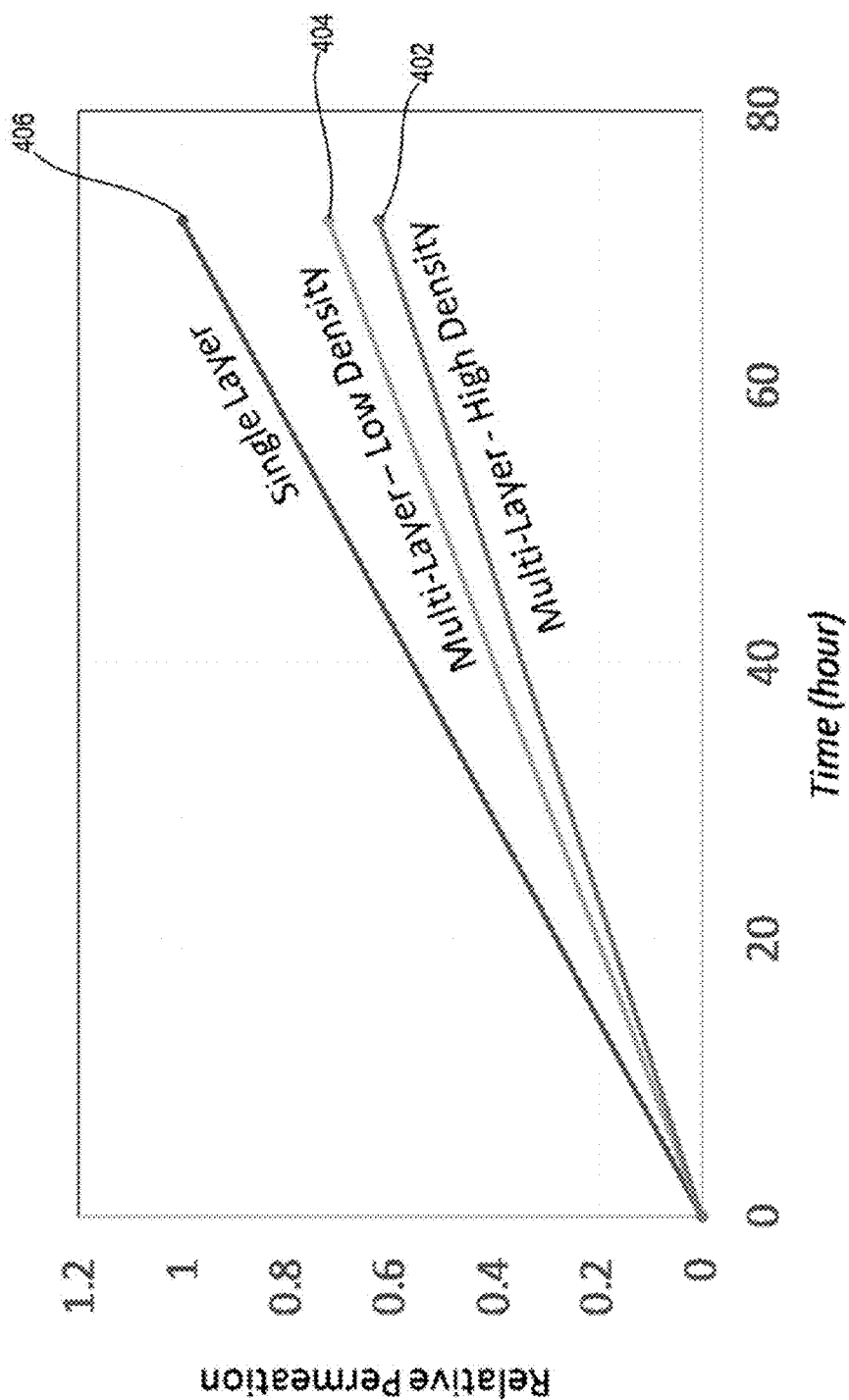
FIG. 5 shows a graph representing malodorant molecule permeation rates through multi-layer films of the present disclosure and single layer films.

FIG. 5 illustrates a graph showing a comparison of permeation rates of malodorant molecules through multi-layer films and single layer films. Referring to FIGS. 2A, 2B and 5 together, the graph shows a comparison of permeation rates of malodorant molecules through a high density multi-layer film 402 (a LLDPE film), a low density multi-layer film 404 (a LLDPE film), and a single layer film 406 (e.g., a sidewall of a conventional bag). The test represented in FIG. 5 commenced with a fixed and constant amount (e.g., concentration) of malodorant molecules disposed on a first side of the multi-layer films and the single layer film and a zero concentration of the malodor molecules on a second opposite side of the multi-layer films and the single layer film. The malodorant molecules included 2-Nonenal. The single layer film had a gauge of about 1.0 mil. The multi-layer films 402, 404 had a combined gauge (not including the air gap) in a range of about 0.8 mils to about 0.9 mils (e.g., two films having thicknesses of about 0.4 mils each). As shown in FIG. 5, permeations rates of malodorant molecules through the multi-layer films 402, 404 of the present disclosure were slower than the thicker single layer film. Thus, the multilayer film including the air gap servers as a barrier to the transport and migration of malodor vapors. In particular, the results of FIG. 5 show that the air gap in combination with two layers provides an improved structure for trapping malodor species and or moisture vapor.

Furthermore, FIG. 5 illustrates a film with a fix concentration on one side (e.g., an infinite source) of a film and zero concentration on the opposite side (e.g., an infinite sink) shows decay and accumulation from high concentration to low concentration. Furthermore, the results of FIG. 5 illustrate that the permeation through the films is proportional to the density of the film. In other words, the higher the density of the double layer films, the slower the permeation through the films. As such, one or more embodiment include an implementation in which the inner film of a multilayer film has a first density and an outer film of the multilayer film has a second density that is higher than the first density. This configuration allows malodorant molecules to permeate through the inner film at a first rate and the outer film at a second rate that is less than the first rate. This configuration allows for trapping of malodorant molecules in the air gap between the inner film and the outer film. Thus, one or more embodiments include an enhanced diffusion/transmission of malodorant molecules, whether as a single permeant or in mixtures, into and throughout multilayer film/bag—driven by a chemical potential or in practical terms by its concentration gradient across the film/bag.

Figure 6:
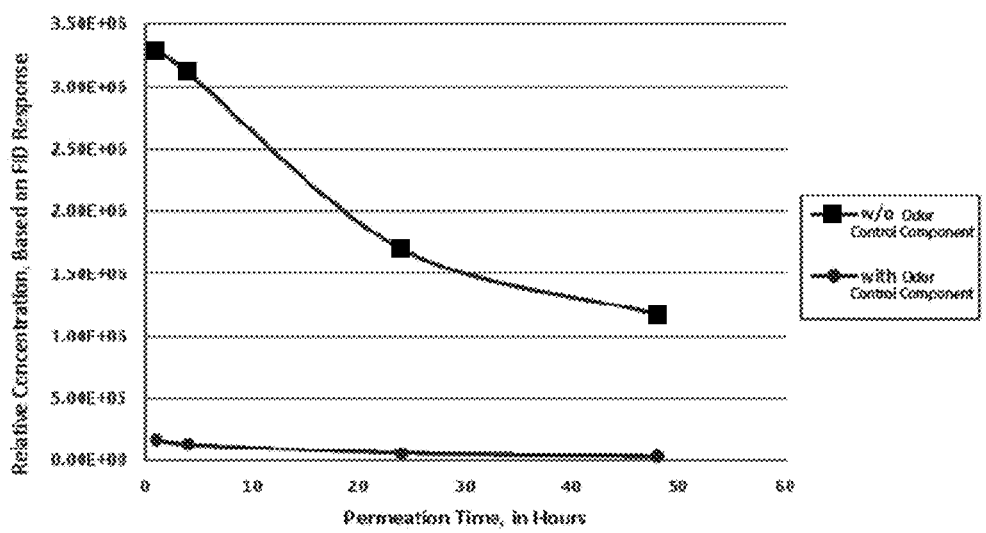
FIG. 6 shows a graph representing malodorant molecule permeation rates through multi-layer films of the present disclosure and single layer films.

FIG. 6 illustrates a graph showing a comparison of permeation of malodorant molecules through multi-layer films having an odor control component between the inner and outer films and multi-layer films not having an odor control component. Referring to FIGS. 2A, 2B, and 6 together, the graph shows a comparison of concentrations of malodorant molecules over time at an exterior of multi-layer films not having the odor control component 206 and at an exterior of multi-layer films having the odor control component 206 between the inner and outer films. Similar to the test represented in FIG. 5, the test commenced with a fixed and constant amount (e.g., concentration) of malodorant molecules disposed on a first side of the multi-layer films and a zero concentration of the malodorant molecules on a second opposite side (e.g., exterior) of the multi-layer films. The malodorant molecules included 2-Nonenal. Furthermore, each of the multi-layer films had approximately (e.g., at least substantially) the same thickness. As shown in FIG. 6, the multi-layer films having the odor control component 206 had significantly lower malodorant molecule concentrations on the second side of the multi-layer films than the multi-layer films not having the odor control component 206. Thus, FIG. 6 shows that an odor control component placed between the inner and outer films absorb or delay the release of malodor or fragrance materials.

Figure 7:
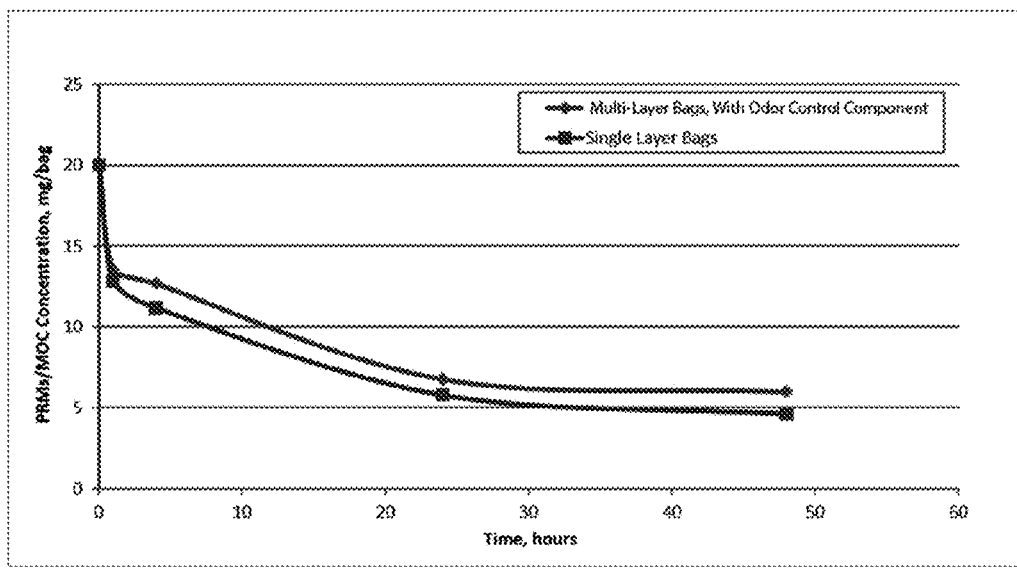
FIG. 7 shows a graph representing malodorant molecule retention of multi-layer films of the present disclosure and single layer films.

FIG. 7 shows a graph representing malodorant molecule retention of multi-layer films of the present disclosure and single layer films. Referring to FIGS. 2A, 2B, and 7 the graph shows a comparison of concentrations of malodorant molecules over time in an interior of a bag formed from a single layer film and in an interior of a multi-layer bag 100 formed from a multi-layer film including the odor control component 206. In other words, FIG. 7 illustrates a graph showing how well the single layer film and the multi-layer film contain the malodorant molecules. The test commenced with 20 mg of malodorant molecules disposed within the bag formed from the single layer film and within the multi-layer bag 100 formed from the multi-layer film. Furthermore, there was a zero concentration of the malodorant molecules on an outside of the bags. The malodorant molecules included 2-Nonenal. The single layer film had a thickness of about 1.0 mil. The multi-layer films had a thickness within a range of about 0.8 mils to about 0.9 mils (e.g., two films having thicknesses of about 0.4 mils each and the third layer). As shown in FIG. 7, over a period of 50 hours, the multi-layer bag 100 formed from the multi-layer film of the present disclosure retained more malodorant molecules than the bag formed from the thicker single layer film. Thus, FIG. 7 shows hindered transmission of malodorant molecules passing through a unit area of film per unit of time with a multilayer film of the present disclosure compared to a thicker single layer film.

Figures 8A, 8B:
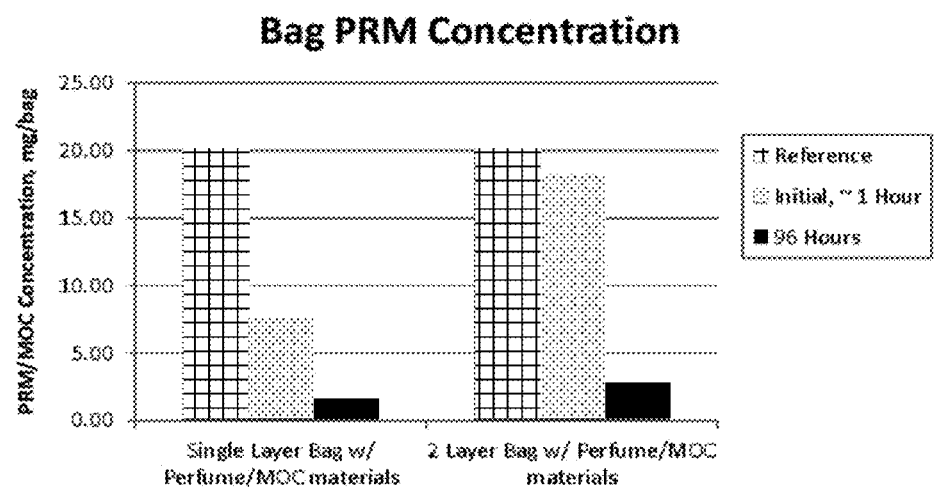
FIGS. 8A and 8B show a graph and table representing a comparison of concentrations of malodorant molecules over time in an interior of a bag formed from a single layer film and an interior of a multi-layer bag according to an embodiment of the present disclosure.

FIG. 8A illustrates a bar graph showing a comparison of perfume retention and fragrance intensity evaluation over time in an interior of a bag formed from a single layer film and in an interior of a bag formed from a multi-layer film including the odor control component 206. Each of the bags includes perfume and malodor control components. The malodorant molecules included 2-Nonenal. The single layer film had a thickness of about 1.0 mil. The multi-layer films had a thickness within a range of about 0.8 mils to about 0.9 mils (e.g., two films having thicknesses of about 0.4 mils each and the third layer). As shown in FIG. 8A, over a period of 96 hours, the multi-layer bag 100 formed from the multi-layer film of the present disclosure retained more than or at least substantially the same amount of perfume as the bag formed from the thicker single layer film. FIG. 8A shows that a single film vs double layered film shows that at 96 hrs, the double layered film/bag has more PRM on the bag that yield a higher noticeability score of fragrance intensity.

FIG. 8B shows a table including results of headspace sensory evaluations that show the overall efficiency (odor reduction from unscented bags) is the same, approximately, for thicker single layer films/bags and thinner double-layered films/bags. The control or reference of FIG. 8B is time zero and an untreated bag. Thus, FIG. 8B shows hindered transmission of chemical species passing through a unit area of film per unit of time with a multilayer film of the present disclosure compared to a thicker single layer film.

Further tests performed by the inventors show a hindered transmission of chemical species passing through a unit area of film per unit of time with a multilayer film of the present disclosure compared to a thicker single layer film. The permeation profile difference, with more inside the headspace initially for single layer bag than double layered bag (ammonia quickly diffusing), permeating faster in double layered bag, and ending up in the same at test end potentially demonstrate why there is no major negative impact on performance.

Yet further tests show an ability to control a direction and rate of permeation by varying thicknesses of the first and second films 202, 204. Additionally, the tests show that one or more embodiments can provide enhanced adsorption (selective and preferential) of the permeant molecules, improved desorption or re-evaporation of perfume/MOC permeant material, and PRM retention, noticeability and malodor reduction profile data at longer time points. Each of the foregoing can have parity performance (i.e., substantially the same performance) relative to single layer having more mass that the plurality of layers in the multi-layer film of one or more embodiments.

Thus, the multi-layer film of the present disclosure may reduce an amount of material needed to produce a product without compromising important product properties, such as controlling the permeation of malodorant molecules through the product. One will appreciate in view of the disclosure herein that such material reductions can provide significant cost savings by reducing an amount of raw material in a given product.

Referring again to FIGS. 2A and 2B, in some embodiments, the multi-layer bag 100 may include the odor control component 206 disposed between the first and second films 202, 204 and an additional odor control component 206 disposed on an exterior or interior of the multi-layer bag 100.

In one or more embodiments, the first and second films 202, 204 of the multi-layer bag 100 may be non-continuously, lightly-bonded to one another. The first and second films 202, 204 may be partially discontinuously bonded to create an intermittingly bonded and stretched multi-layer sidewalls. For example, the first and second films 202, 204 may be discontinuously bonded together via one or more of the methods of bonding films together as described in U.S. Pat. No. 8,603,609, the disclosure of which is incorporated in its entirety by reference herein. In particular, the first and second films 202, 204 may be bonded via one or more of MD rolling, TD rolling, DD ring rolling, SELF'ing, pressure bonding, corona lamination, adhesives, or combinations thereof. In some embodiments, the first and second films 202, 204 may be bonded such that the bonded regions have bond strengths below a strength of the weakest film of the first and second films 202, 204. In other words, the bonded regions may fail (e.g., break apart) before the first or second films 202, 204 fail. As a result, discontinuously bonding the first and second films 202, 204 may can also increase or otherwise modify one or more of the tensile strength, tear resistance, impact resistance, or elasticity of the films. Furthermore, the bonded regions between the first and second films 202, 204 may provide additional strength. Such bonded regions may be broken to absorb forces rather than such forces resulting in tearing of the film.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Discontinuously bonding the first and second films 202, 204 together results in un-bonded regions and bonded regions between the first and second films 202, 204. For example, discontinuously bonding the first and second films 202, 204 together may result in un-bonded regions and bonded regions as described in the US Patent Application Publication number 2012-0134606, the disclosure of which is incorporated in its entirety by reference herein. In some embodiments, the odor control component 206 (i.e., the one or more substances of the odor control component 206) may be disposed between the first and second films 202, 204 in the un-bonded regions (i.e., air gaps). In some embodiments, the un-bonded regions may be disposed (e.g., formed) between adjacent bonded regions.

Figure 9:
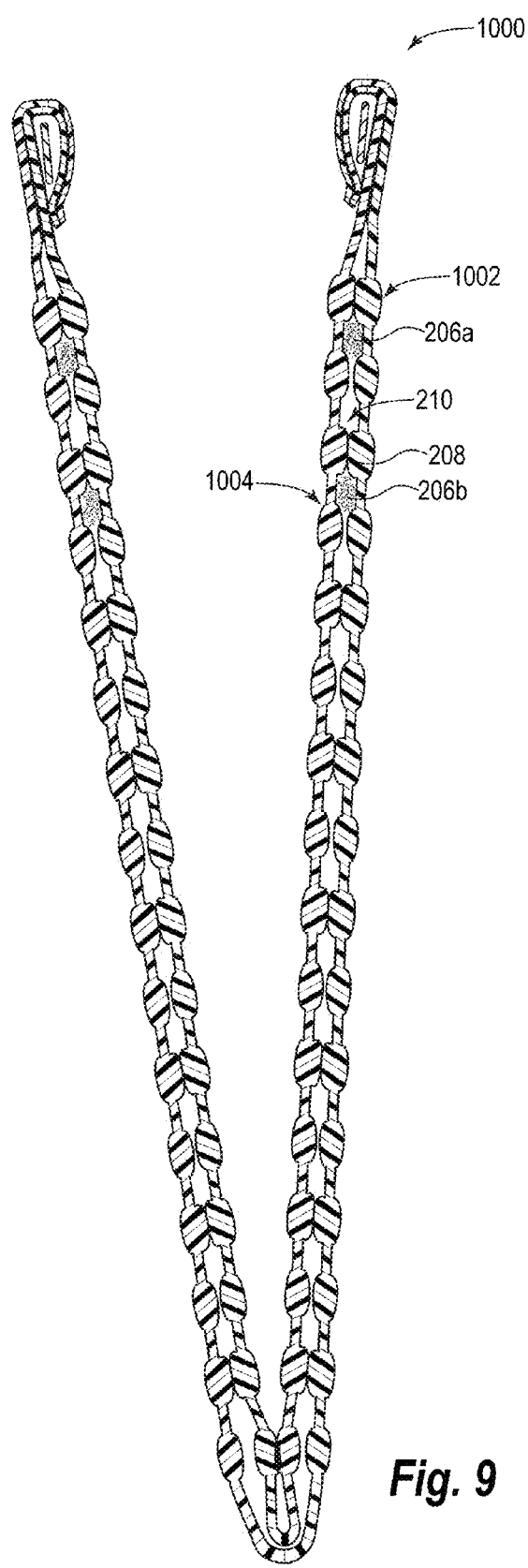
FIG. 9 shows a side cross-sectional view of the multi-layer bag according to another embodiment of the present disclosure.

FIG. 9 is a side cross-sectional view of a multi-layer bag 1000 having a multi-layer film according to another embodiment of the present disclosure. Similar to the other multi-layer bags 100 disclosed herein, the multi-layer bag 100 includes bonded regions 208 and un-bonded regions or airgaps 210. In some embodiments, the bonded regions may comprise less than about 30 percent of a total area of the multi-layer film. Furthermore, the odor control component 206 may be disposed within the un-bonded regions or air gaps 210. Disposing the odor control component 206 within the un-bonded regions or air gaps 210 provides separations (e.g., distinct portions) of the odor control component 206. As a result, incompatible and/or antagonistic substances may be utilized within the odor control components 206 in different regions of the multi-layer film. For example, a first substance 206a may be used within a first region of un-bonded regions 210 of the multi-layer film 101, and a second substance 206b incompatible with the first substance may be used within a second different region of un-bonded regions 210 of the multi-layer film. Examples of such incompatible or antagonistic substances may include cyclodextrin, crystalline solid fragrance ingredients, or perfume micro capsules (PMCs). Further examples of incompatible or antagonistic substances may include fragrance materials and hydrogen peroxide (e.g., two incompatible substances that when mixed yield a wrong character but when applied separately, yield an appropriate character).

Furthermore, in some embodiments, the first and second substances may be compatible and may, when mixed, produce odor-controlling features. For example, the first substance may react with the second substance and produce a fragrance or deodorizing features. As a result, when the multi-layer film of the multi-layer film is strained and one or more bonded regions 208 are broken, the first and second substance may mix and provide an odor-controlling feature. Put another way, when the multi-layer bag 100 is full (e.g., likely to have fragrance materials), the bonded regions 208 may break mixing the first and second substances and releasing odor-controlling features.

Figure 10:
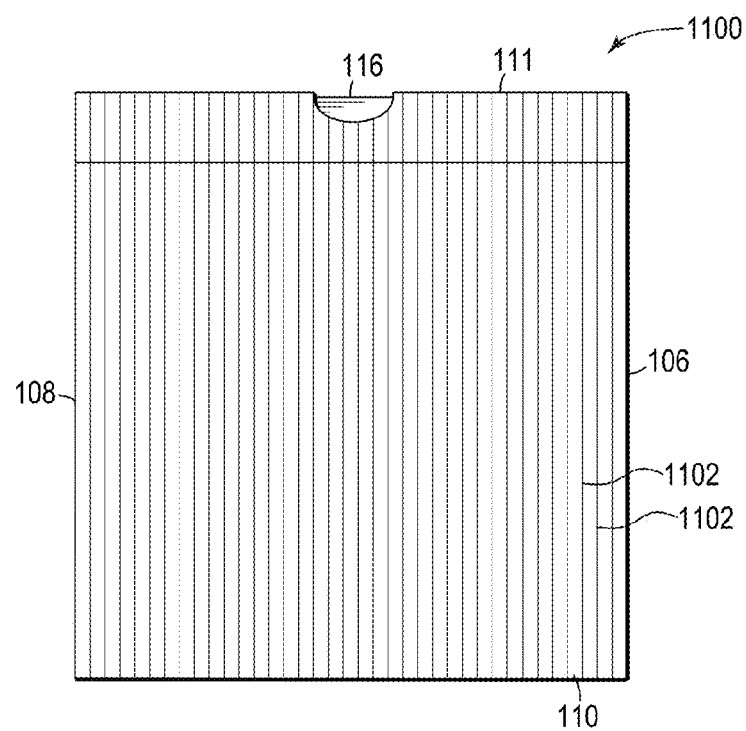
FIG. 10 is a front side view of a multi-layer bag having lightly bonded regions according to an embodiment of the present disclosure.

FIGS. 10-13 show example patterns of bonds of multi-layer bags. For example, as shown in FIG. 10, the multi-layer bag 1100 may include a striped pattern of bonded regions 208. The striped pattern may include ribs that include bonded stripes (e.g., bonded regions 208 extending in a longitudinal direction) that extend across the multi-layer bag 1100 in a direction transverse (i.e., transverse direction) to a direction in which the film was extruded (i.e., machine direction). In particular, the ribs and the bonds can extend from a bottom edge of the multi-layer bag 1100 to the top edge 110 of the multi-layer bag 1100. Furthermore, the bonded stripes can extend across the entire length of the multi-layer bag 1100. Although a specific pattern is illustrated in FIG. 10, the disclosure is not so limited and one of ordinary skill in the art will readily recognize that the striped pattern may vary depending on the methods used to incrementally stretch and partially discontinuously bond the first and second films 202, 204.

Figure 11:
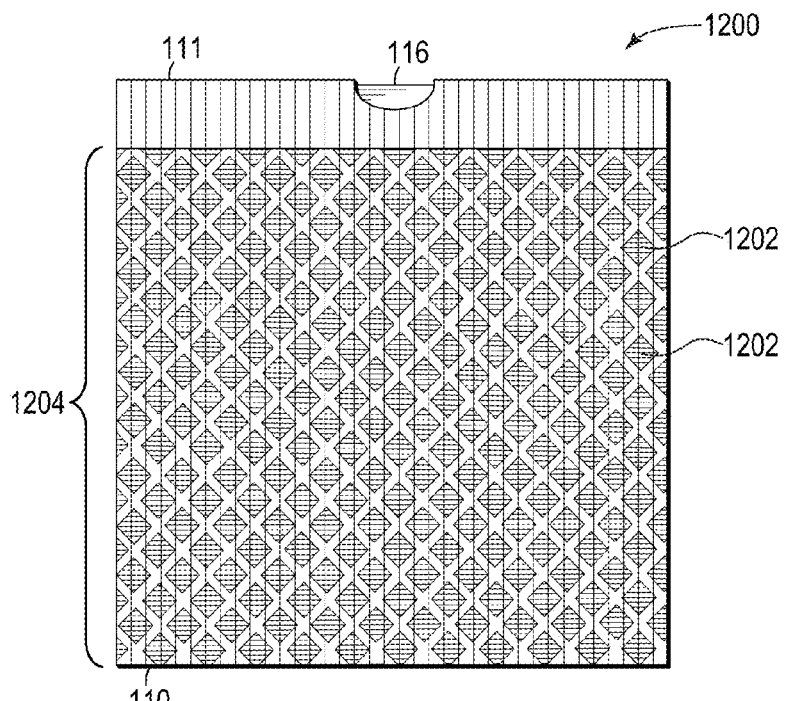
FIG. 11 is a front side view of a multi-layer bag having lightly bonded regions according to another embodiment of the present disclosure.

As another non-limiting example, as shown in FIG. 11, the multi-layer bag 1200 may include an array of diamond shaped bonded regions 1202 (referred to hereinafter as "diamond pattern"). In some embodiments, only a portion (e.g., lower section 1204) of the multi-layer bag 1200 may include the diamond pattern. Other portions of the multi-layer bag 1200 may include other patterns of bonded regions 208 (FIG. 9). Thus, the density of bonded regions 208 (FIG. 10) may vary throughout different sections of the multi-layer bag 1200.

Figure 12:
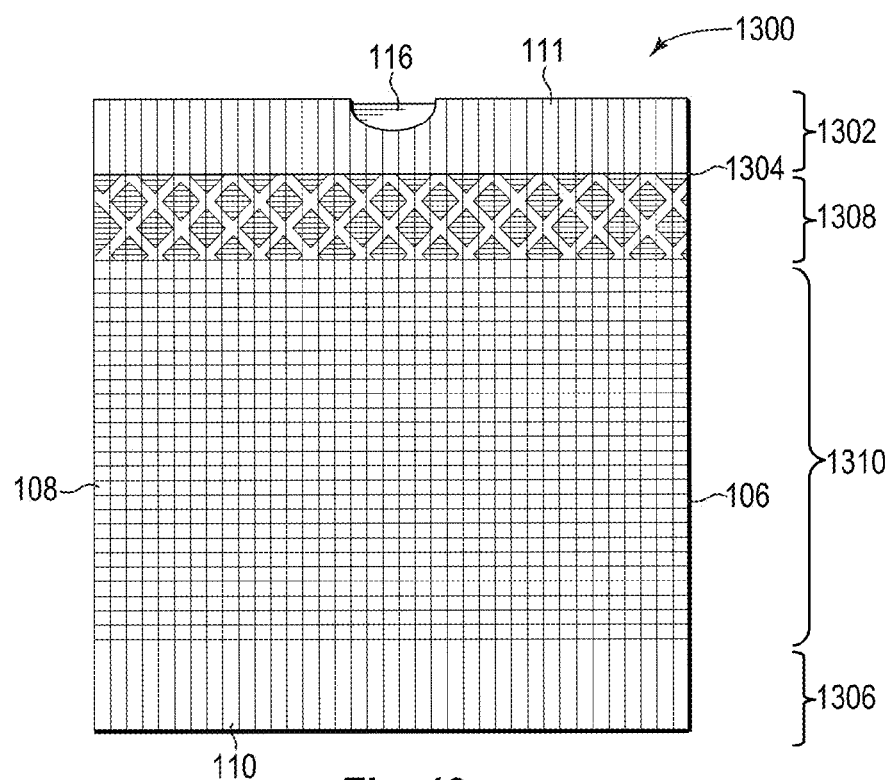
FIG. 12 is a front side view of a multi-layer bag having lightly bonded regions according to another embodiment of the present disclosure.

As yet another example, as shown in FIG. 12, the multi-layer bag 1300 may include a top section 1302 that extends from a top edge 111 of the multi-layer bag 1300 to a hem seal 1304. The multi-layer bag 1300 may also include a bottom section 1306 extending from a bottom edge of the multi-layer bag 1300 toward the top edge 111 of the multi-layer bag 1300. As shown in FIG. 12, in one or more embodiments, the top section 1302 and the bottom section 1306 may have at least substantially the same width. The multi-layer bag 1300 further includes an upper section 1308 extending from the top section 1302 and the hem seal 1304 toward the bottom edge 110 of the multi-layer bag 1300. In some embodiments, the upper section 1308 has at least substantially the same width the top and bottom sections 1302, 1306 of the multi-layer bag 1300. Finally, the multi-layer bag 1300 may include a middle section 1310 located between the upper section 1308 and the bottom section 1306. In some embodiments, the middle section 1310 may include a majority of the multi-layer bag 1300. Bonding different sections of the multi-layer bag 100 with different bond patterns may provide the different portions of the multi-layer bag 100 with different properties (e.g., strengths and flexibilities).

Figure 13:
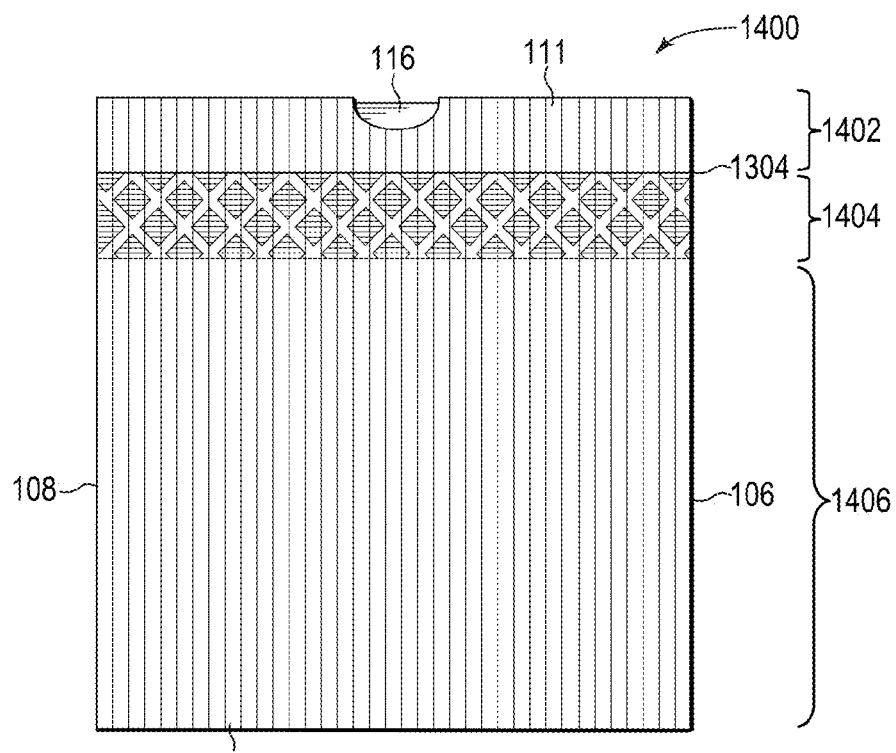
FIG. 13 is a front side view of a multi-layer bag having lightly bonded regions according to another embodiment of the present disclosure.

FIG. 13 illustrates yet another example of multi-layer bag 1400. The multi-layer bag 1400 includes a top section 1402 that extends from the top edge 111 of the multi-layer bag 1400 to the hem seal 1304. The multi-layer bag 1400 includes an upper section 1404 that extends from the top section 1402 and the hem seal 1304 toward the bottom edge 110 of the multi-layer bag 1400. In one or more embodiments, the top section 1402 and the upper section 1404 can have at least substantially the same width. Finally, the multi-layer bag 100 may include a bottom section 1406 that extends from the bottom edge 110 of the multi-layer bag 1400 toward to the upper section 1404.

The multi-layer bag 1400 shown in FIG. 13 may be similar to the multi-layer bag 1100 shown in FIG. 10, however, the upper section 1404 of the multi-layer bag 1400 may include a strainable network in a diamond pattern (e.g., bonded regions 208 (FIG. 10)) in the shape of diamond). Thus, the density of bonded regions 208 in the upper section 1404 of the multi-layer bag 1400 may be greater than the density of bonded regions 208 elsewhere in the multi-layer bag 1400.

In view of the foregoing, one of ordinary skill in the art considering the present disclosure will readily appreciate that a manufacturer can tailor specific sections or zones of a bag or film with desirable properties by MD, TD, DD ring rolling, SELF'ing, or combinations thereof. For example, the multi-layer bag 100 may include bonded regions 208 (FIG. 10) in any of the patterns described in U.S. Pat. No. 8,603,609. Furthermore, one of ordinary skill in the art considering the present disclosure will readily recognize that one or more implementations of the multi-layer bag 100 may include bonded regions 208 (FIG. 10) arranged in other patterns/shapes. Such additional patterns may include intermeshing circles, squares, diamonds, hexagons, or other any other polygons and shapes. Additionally, one or more implementations can include bonded regions 208 arranged in patterns that are combinations of the illustrated and described patterns/shapes.

Figure 14:
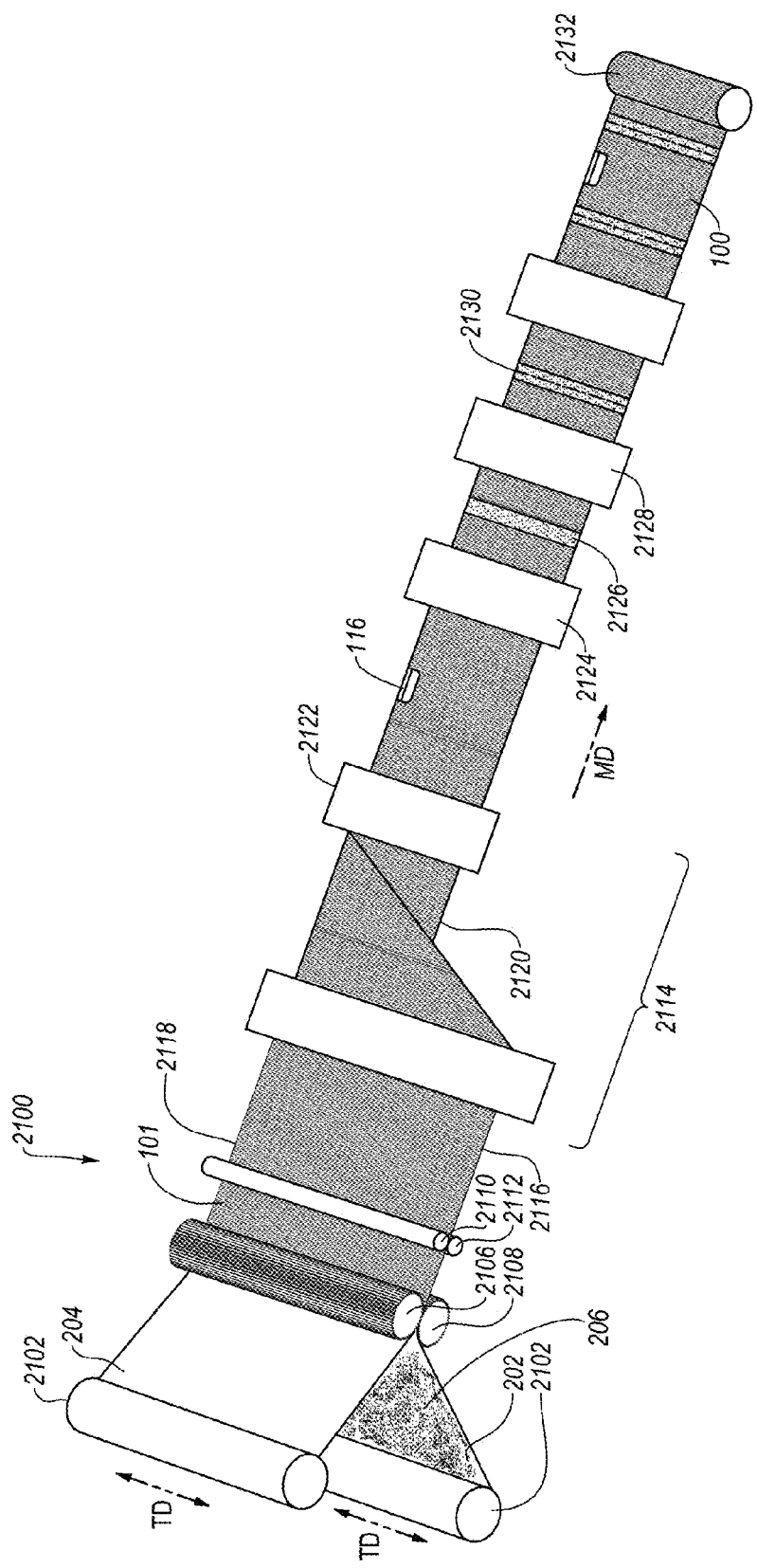
FIG. 14 shows a schematic diagram of a bag manufacturing process according to one or more embodiments of the present disclosure.

FIG. 14 illustrates an exemplary embodiment of a manufacturing process for making multi-layer thermoplastic film (e.g., the first and second films 202, 204) having the odor controls layer disposed therein and then producing multi-layer plastic bags therefrom. Referring to FIGS. 1, 2A, 2B, and 14 together, according to the process 2100, a first film 202 and a second film 204 may be unwound from stock rolls 2102, respectively, and directed along a machine direction MD. Alternatively, the first and second films 202, 204 may be directly from one or more extrusion towers rather than stock rolls 2102.

The odor control component 206 (i.e., one or more substances) may be applied to one or more of the first and second films 202, 204 on the inner sides of the first and second films 202, 204 (e.g., the sides of the first and second films 202, 204 that will be bonded together) prior to bonding the first and second films 202, 204. The odor control component 206 may be applied through one or more of laminating, dusting, spraying, rolling, and any other method known in the art for applying substances to films.

After the odor control component 206 have been applied to one or more of the first and second films 202, 204, the first and second films 202, 204 may be passed between a pair of cylindrical intermeshing rollers 2106, 2108 to incrementally stretch and lightly laminate the initially separate first and second films 202, 204 to create un-bonded regions 210 and bonded regions 208 in at least one section of a multi-layer film (i.e., eventual sidewall of the multi-layer bag 100). The intermeshing rollers 2106, 2108 shown in FIG. 15 may have a construction similar to that of any of the intermeshing rollers described in U.S. Pat. No. 8,603,609. The rollers 2106, 2108 may be oriented such that longitudinal axes of the rollers are perpendicular to the machine direction. Additionally, the rollers 2106, 2108 may rotate about their longitudinal axes in opposite rotational directions. In some embodiments, motors may be provided to power rotation of the rollers 2106, 2108 in a controlled manner. As the first and second films 202, 204 pass between the pair of rollers 2106, 2108, the ridges and/or teeth of the rollers 2106, 2108 can form the multi-layer film (i.e., eventual sidewall of the multi-layer bag 100).

In some embodiments, the odor control component 206 may assist in bonding the first and second films 202, 204 together. For example, in embodiments wherein the odor control component 206 includes adhesive, the odor control component 206 may at least partially bond the first and second films 202, 204 together. In one or more embodiments, the odor control component 206 may be at least partially pushed (e.g., squeezed) by the intermeshing rollers 2106, 2108 into the un-bonded regions 210 (FIG. 10) of the multi-layer film. Thus, bonding the first and second films together can involve activating the odor control component using heat and or pressure to cause the odor control component to bond the first film to the second film.

During the manufacturing process 2100, the multi-layer film can also pass through a pair of pinch rollers 2110, 2112. The pinch rollers 2110, 2112 can be appropriately arranged to grasp the multi-layer film.

A folding operation 2114 can fold the multi-layer film to produce the sidewalls of the finished bag. The folding operation 2114 can fold the multi-layer film in half along the transverse direction. In particular, the folding operation 2114 can move a first edge 2116 adjacent to the second edge 2118, thereby creating a folded edge 2120. For example, the process may include the folding operation described in U.S. Pat. No. 8,568,283, the entire contents of which are hereby incorporated by reference in their entirety.

To produce the finished bag, the processing equipment may further process the folded multi-layer film. In particular, a draw tape 116 operation 2122 can insert a draw tape 116 into ends 2116, 2118 of the multi-layer film. Furthermore, a sealing operation 2124 can form the parallel side edges of the finished bag by forming heat seals 2126 between adjacent portions of the folded multi-layer lightly-laminated film. The heat seal 2126 may strongly bond adjacent layers together in the location of the heat seal 2126 so as to tightly seal the edges (e.g., produce an at least substantially water tight seal) of the finished bag. The heat seals 2126 may be spaced apart along the folded multi-layer film to provide a desired width to the finished bags. The sealing operation 2124 can form the heat seals 2126 using a heating device, such as, a heated knife.

A perforating operation 2128 may form a perforation 2130 in the heat seals 2126 using a perforating device, such as, a perforating knife. The perforations 2130 in conjunction with the folded outer edge 2120 can define individual bags 100 that may be separated from the multi-layer film. A roll 2132 can wind the multi-layer lightly-laminated film embodying the finished bags 100 for packaging and distribution. For example, the roll 2132 may be placed into a box or bag for sale to a customer.

In still further implementations, the folded multi-layer lightly-laminated film may be cut into individual bags along the heat seals 2126 by a cutting operation. In another implementation, the folded multi-layer lightly-laminated film may be folded one or more times prior to the cutting operation. In yet another implementation, the side sealing operation 2124 may be combined with the cutting and/or perforation operations 2128.

One will appreciate in view of the disclosure herein that the process 2100 described in relation to FIG. 14 can be modified to omit or expanded acts, or vary the order of the various acts as desired.

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be co-extruded so that the layers have a bond strength that provides for delamination prior to film failure to provide similar benefits to those described above. Thus, the described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A multi-layer thermoplastic film comprising:
   a first film of thermoplastic material;
   a second film of thermoplastic material bonded to the first film; and
   an odor control component disposed between the first film and the second film;
   wherein a permeation rate of malodor molecules through the multi-layer thermoplastic film is less than a permeation rate of malodor molecules through a single layer film having a mass per unit area greater than a mass per unit area of the multi-layer thermoplastic film.

2. The multi-layer thermoplastic film of claim 1, wherein the odor control component comprises one or more of a deodorizing agent or a fragrance.

3. The multi-layer thermoplastic film of claim 1, wherein the odor control component comprises an adhesive.

4. The multi-layer thermoplastic film of claim 1, further comprising an air gap between the first film and the second film, the odor control component being disposed within the air gap and encapsulated by the first and second films.

5. The multi-layer thermoplastic film of claim 1, wherein the odor control component consists of a substance that has both a permeation rate of malodor molecules through the multi-layer thermoplastic film is less than a permeation rate of malodor molecules through a single layer film having a mass per unit area greater than a mass per unit area of the multi-layer thermoplastic film.

6. The multi-layer thermoplastic film claim 1, the odor control component comprising:
   a first component of a first substance applied to the first film; and
   a second component of a second different substance applied to the second film.

7. The multi-layer thermoplastic film of claim 1, further comprising:
   a plurality of bonded regions securing the first film to the second film; and
   a plurality of un-bonded regions, each un-bonded region being disposed between adjacent bonded regions of the plurality of bonded regions.

8. The multi-layer thermoplastic film of claim 7, wherein the odor control component of the multi-layer thermoplastic film is disposed within the plurality of un-bonded regions.

9. The multi-layer thermoplastic film of claim 8, wherein the odor control component comprises a first material within a first un-bonded region of the plurality of un-bonded regions and comprises a second different material within a second un-bonded region of the plurality of un-bonded regions.

10. A multi-layer bag, comprising:
    a first sidewall and a second sidewall joined along a bottom edge, a first side edge, and an opposing second side edge, each of the first sidewall and the second sidewall comprising:
      a first film of thermoplastic material;
      a second film of thermoplastic material bonded to the first film; and
      an odor control component disposed between the first film and the second film
      wherein a permeation rate of malodor molecules through the first sidewall is less than a permeation rate of malodor molecules through a single layer film having a mass per unit area greater than a mass per unit area of the first sidewall.

11. The multi-layer bag of claim 10, wherein each of the first film and the second film comprises a plurality of coextruded layers.

12. The multi-layer bag of claim 10, wherein the first film has a first thickness and the second film has as second thickness that differs from the first thickness thereby causing a diffusion gradient as malodor molecules permeate through the first and second films that at least partially traps the malodor molecules between the first film and the second film.

13. The multi-layer bag of claim 10, wherein the odor control component comprises a perfume that has a delayed release due to being position between the first and second films.

14. The multi-layer bag of claim 10, wherein the odor control component comprises a substance that leads to skin irritation or dust inhalation.

15. The multi-layer bag of claim 14, wherein the odor control component comprises one or more of activated carbon, calcium carbonate, magnesium carbonate, barium carbonate, alumina, magnesium oxide, zinc oxide, superabsorbent polymers, calcium chloride, zeolite (aluminosilicates), pulp (wood) powder, hydrogen peroxide, peroxydone, halohydantoins, magnesium hydroxide hypochlorite oxide, sodium perborate, sodium percarbonate, or acid catalysts.

16. The multi-layer bag of claim 10, wherein the odor control component comprises a sticky substance.

17. The multi-layer bag of claim 16, wherein the odor control component comprises polyethylene glycol copolymers, polyethylenimine, or silicone.

18. The method of claim 13, wherein bonding the first and second films together comprises activating the odor control component using heat and or pressure to cause the odor control component to bond the first film to the second film.

19. A method of manufacturing a multi-layer thermoplastic bag, comprising:
    coextruding a plurality of layers to form a first film;
    coextruding a plurality of layers to form a second film;
    disposing an odor control component on a surface of the first film, wherein a permeation rate of malodor molecules through the first film is less than a permeation rate of malodor molecules through a single layer film having a mass per unit area greater than a mass per unit area of the first film;
    bonding the first and second films together such that the odor control component is disposed between the first film and the second film; and
    forming the first and second films into a bag.

20. The method of claim 19, further comprising disposing a second odor control component on a surface of the second film, the second odor control component differing from the odor control component disposed on the first film.

* * * * *